US011526608B2

(12) United States Patent
Slipenchuk et al.

(10) Patent No.: US 11,526,608 B2
(45) Date of Patent: Dec. 13, 2022

(54) METHOD AND SYSTEM FOR DETERMINING AFFILIATION OF SOFTWARE TO SOFTWARE FAMILIES

(71) Applicant: Group IB TDS, Ltd, Moscow (RU)

(72) Inventors: Pavel Vladimirovich Slipenchuk, Moscow (RU); Ilia Sergeevich Pomerantsev, Mendeleevo (RU)

(73) Assignee: GROUP IB TDS, LTD, Moscow (RU)

( * ) Notice: Subject to any disclaimer, the term of this patent is extended or adjusted under 35 U.S.C. 154(b) by 293 days.

(21) Appl. No.: 17/077,132

(22) Filed: Oct. 22, 2020

(65) Prior Publication Data

US 2021/0173926 A1     Jun. 10, 2021

(51) Int. Cl.
*G06N 20/00* (2019.01)
*G06F 21/56* (2013.01)

(52) U.S. Cl.
CPC ........... *G06F 21/563* (2013.01); *G06N 20/00* (2019.01); *G06F 2221/033* (2013.01)

(58) Field of Classification Search
CPC ...... G06F 21/563; G06F 21/566; G06F 21/53; G06F 8/433; G06F 2221/033; G06N 20/00
USPC .......................................................... 726/23
See application file for complete search history.

(56) References Cited

U.S. PATENT DOCUMENTS

| | | |
|---|---|---|
| 6,928,434 B1 | 8/2005 | Choi et al. |
| 7,225,343 B1 | 5/2007 | Honig et al. |
| 7,383,581 B1 | 6/2008 | Moore et al. |
| 7,496,628 B2 | 2/2009 | Arnold et al. |
| 7,712,136 B2 | 5/2010 | Sprosts et al. |
| 7,730,040 B2 | 6/2010 | Reasor et al. |
| 7,865,953 B1 | 1/2011 | Hsieh et al. |

(Continued)

FOREIGN PATENT DOCUMENTS

| | | |
|---|---|---|
| AU | 2017203008 B2 | 3/2019 |
| CN | 103491205 A | 1/2014 |

(Continued)

OTHER PUBLICATIONS

Search Report with regard to the NL Patent Application No. 2027556 completed Sep. 29, 2021.

(Continued)

*Primary Examiner* — Jeffrey C Pwu
*Assistant Examiner* — Paul J Skwierawski
(74) *Attorney, Agent, or Firm* — BCF LLP

(57) ABSTRACT

Methods and systems for determining an affiliation of a given software with target software are provided. The method comprises: receiving a software source code of the given software; executing the software source code in an isolated program environment to identify at least one outgoing request of the given software, the at least one outgoing request being indicative of at least one respective function of the software source code; generating, based on the at least one outgoing request, a respective function identifier associated with the at least one respective function; applying at least one classifier to the respective function identifier to determine a likelihood parameter indicative of the given software being affiliated to a respective target software; in response to the likelihood parameter being equal to or greater than a predetermined likelihood parameter threshold: identifying the given software as being affiliated to the respective target software.

25 Claims, 9 Drawing Sheets

(56) References Cited

U.S. PATENT DOCUMENTS

| | | |
|---|---|---|
| 7,958,555 B1 | 6/2011 | Chen et al. |
| 7,984,500 B1 | 7/2011 | Khanna et al. |
| 8,132,250 B2 | 3/2012 | Judge et al. |
| 8,151,341 B1 | 4/2012 | Gudov |
| 8,255,532 B2 | 8/2012 | Smith-Mickelson et al. |
| 8,260,914 B1 | 9/2012 | Ranjan |
| 8,285,830 B1 | 10/2012 | Stout et al. |
| 8,402,543 B1 | 3/2013 | Ranjan et al. |
| 8,448,245 B2 | 5/2013 | Banerjee et al. |
| 8,532,382 B1 | 9/2013 | Ioffe |
| 8,539,582 B1 | 9/2013 | Aziz et al. |
| 8,555,388 B1 | 10/2013 | Wang et al. |
| 8,561,177 B1 | 10/2013 | Aziz et al. |
| 8,600,993 B1 | 12/2013 | Gupta et al. |
| 8,612,463 B2 | 12/2013 | Brdiczka et al. |
| 8,625,033 B1 | 1/2014 | Marwood et al. |
| 8,635,696 B1 | 1/2014 | Aziz |
| 8,650,080 B2 | 2/2014 | O'Connell et al. |
| 8,660,296 B1 | 2/2014 | Ioffe |
| 8,677,472 B1 | 3/2014 | Dotan et al. |
| 8,683,595 B1 | 3/2014 | Barker |
| 8,776,229 B1 | 7/2014 | Aziz |
| 8,850,571 B2 | 9/2014 | Staniford et al. |
| 8,856,937 B1 | 10/2014 | Wüest et al. |
| 8,972,412 B1 | 3/2015 | Christian et al. |
| 8,984,640 B1 | 3/2015 | Emigh et al. |
| 9,026,840 B1 | 5/2015 | Kim |
| 9,060,018 B1 | 6/2015 | Yu et al. |
| 9,165,142 B1 | 10/2015 | Sanders et al. |
| 9,210,111 B2 | 12/2015 | Chasin et al. |
| 9,215,239 B1 | 12/2015 | Wang et al. |
| 9,223,972 B1 | 12/2015 | Vincent et al. |
| 9,253,208 B1 | 2/2016 | Koshelev |
| 9,330,258 B1 | 5/2016 | Satish et al. |
| 9,338,181 B1 | 5/2016 | Burns et al. |
| 9,357,469 B2 | 5/2016 | Smith et al. |
| 9,456,000 B1 | 9/2016 | Spiro et al. |
| 9,654,593 B2 | 5/2017 | Garg et al. |
| 9,723,344 B1 | 8/2017 | Granström et al. |
| 9,736,178 B1 | 8/2017 | Ashley |
| 9,917,852 B1 | 3/2018 | Xu et al. |
| 9,934,376 B1 | 4/2018 | Ismael |
| 10,148,685 B2 | 12/2018 | Hassanzadeh et al. |
| 10,284,574 B1 | 5/2019 | Aziz et al. |
| 10,467,411 B1 | 11/2019 | Pidathala et al. |
| 10,546,143 B1 | 1/2020 | Wesson |
| 2002/0161862 A1 | 10/2002 | Horvitz |
| 2003/0009696 A1 | 1/2003 | Bunker et al. |
| 2006/0021029 A1 | 1/2006 | Brickell et al. |
| 2006/0037080 A1 | 2/2006 | Maloof |
| 2006/0074858 A1 | 4/2006 | Etzold et al. |
| 2006/0107321 A1 | 5/2006 | Tzadikario |
| 2006/0224898 A1 | 10/2006 | Ahmed |
| 2006/0253582 A1 | 11/2006 | Dixon et al. |
| 2007/0019543 A1 | 1/2007 | Wei et al. |
| 2007/0239999 A1 | 10/2007 | Honig et al. |
| 2008/0172651 A1 | 7/2008 | Davia |
| 2009/0138342 A1 | 5/2009 | Otto et al. |
| 2009/0281852 A1 | 11/2009 | Abhari et al. |
| 2009/0292925 A1 | 11/2009 | Meisel |
| 2010/0011124 A1 | 1/2010 | Wei et al. |
| 2010/0037314 A1 | 2/2010 | Perdisci et al. |
| 2010/0076857 A1 | 3/2010 | Deo et al. |
| 2010/0115620 A1 | 5/2010 | Alme |
| 2010/0115621 A1 | 5/2010 | Staniford et al. |
| 2010/0191737 A1 | 7/2010 | Friedman et al. |
| 2010/0205665 A1 | 8/2010 | Komili et al. |
| 2010/0235918 A1 | 9/2010 | Mizrahi et al. |
| 2011/0222787 A1 | 9/2011 | Thiemert et al. |
| 2012/0030293 A1 | 2/2012 | Bobotek |
| 2012/0079596 A1 | 3/2012 | Thomas et al. |
| 2012/0087583 A1 | 4/2012 | Yang et al. |
| 2012/0158626 A1 | 6/2012 | Zhu et al. |
| 2012/0233656 A1 | 9/2012 | Rieschick et al. |
| 2012/0291125 A1 | 11/2012 | Maria |
| 2013/0086677 A1 | 4/2013 | Ma et al. |
| 2013/0103666 A1 | 4/2013 | Sandberg et al. |
| 2013/0111591 A1 | 5/2013 | Topan et al. |
| 2013/0117848 A1 | 5/2013 | Golshan et al. |
| 2013/0191364 A1 | 7/2013 | Kamel et al. |
| 2013/0227691 A1 | 8/2013 | Aziz et al. |
| 2013/0263264 A1 | 10/2013 | Klein et al. |
| 2013/0297619 A1 | 11/2013 | Chandrasekaran et al. |
| 2013/0340080 A1 | 12/2013 | Gostev et al. |
| 2014/0033307 A1 | 1/2014 | Schmidtler |
| 2014/0058854 A1 | 2/2014 | Ranganath et al. |
| 2014/0082730 A1 | 3/2014 | Vashist et al. |
| 2014/0173287 A1 | 6/2014 | Mizunuma |
| 2014/0310811 A1 | 10/2014 | Hentunen |
| 2015/0007250 A1 | 1/2015 | Dicato, Jr. et al. |
| 2015/0049547 A1 | 2/2015 | Kim |
| 2015/0067839 A1 | 3/2015 | Wardman et al. |
| 2015/0163242 A1 | 6/2015 | Laidlaw et al. |
| 2015/0170312 A1 | 6/2015 | Mehta et al. |
| 2015/0178306 A1 | 6/2015 | Yang et al. |
| 2015/0200963 A1 | 7/2015 | Geng et al. |
| 2015/0220735 A1 | 8/2015 | Paithane et al. |
| 2015/0227364 A1 | 8/2015 | Asadullah et al. |
| 2015/0295945 A1 | 10/2015 | Canzanese et al. |
| 2015/0356291 A1 | 12/2015 | Zakorzhevsky et al. |
| 2015/0363791 A1 | 12/2015 | Raz et al. |
| 2015/0381654 A1 | 12/2015 | Wang et al. |
| 2016/0036837 A1 | 2/2016 | Jain et al. |
| 2016/0036838 A1 | 2/2016 | Jain et al. |
| 2016/0044054 A1 | 2/2016 | Stiansen et al. |
| 2016/0055490 A1 | 2/2016 | Keren et al. |
| 2016/0065595 A1 | 3/2016 | Kim et al. |
| 2016/0112445 A1 | 4/2016 | Abramowitz |
| 2016/0127388 A1 | 5/2016 | Cabot et al. |
| 2016/0127907 A1 | 5/2016 | Baxley et al. |
| 2016/0132521 A1 | 5/2016 | Reininger et al. |
| 2016/0149943 A1 | 5/2016 | Kaloroumakis et al. |
| 2016/0191243 A1 | 6/2016 | Manning |
| 2016/0205122 A1 | 7/2016 | Bassett |
| 2016/0205123 A1 | 7/2016 | Almurayh et al. |
| 2016/0226894 A1 | 8/2016 | Lee et al. |
| 2016/0253679 A1 | 9/2016 | Venkatraman et al. |
| 2016/0261628 A1 | 9/2016 | Doron et al. |
| 2016/0267179 A1 | 9/2016 | Mei et al. |
| 2016/0285907 A1 | 9/2016 | Nguyen et al. |
| 2016/0306974 A1 | 10/2016 | Turgeman et al. |
| 2016/0359679 A1 | 12/2016 | Parandehgheibi et al. |
| 2017/0006045 A1 | 1/2017 | Kivva et al. |
| 2017/0034211 A1 | 2/2017 | Buergi et al. |
| 2017/0111377 A1 | 4/2017 | Park et al. |
| 2017/0134401 A1 | 5/2017 | Medvedovsky et al. |
| 2017/0142144 A1 | 5/2017 | Weinberger et al. |
| 2017/0149813 A1 | 5/2017 | Wright et al. |
| 2017/0200457 A1 | 7/2017 | Chai et al. |
| 2017/0230401 A1 | 8/2017 | Ahmed et al. |
| 2017/0244735 A1 | 8/2017 | Visbal et al. |
| 2017/0250972 A1 | 8/2017 | Ronda et al. |
| 2017/0251003 A1 | 8/2017 | Rostami-Hesarsorkh et al. |
| 2017/0262633 A1 | 9/2017 | Miserendino et al. |
| 2017/0272471 A1 | 9/2017 | Veeramachaneni et al. |
| 2017/0279818 A1 | 9/2017 | Milazzo et al. |
| 2017/0286544 A1 | 10/2017 | Hunt et al. |
| 2017/0289187 A1 | 10/2017 | Noel et al. |
| 2017/0295157 A1 | 10/2017 | Chavez et al. |
| 2017/0295187 A1 | 10/2017 | Havelka et al. |
| 2017/0324738 A1 | 11/2017 | Hari et al. |
| 2017/0346839 A1 | 11/2017 | Peppe et al. |
| 2018/0012021 A1 | 1/2018 | Volkov |
| 2018/0012144 A1 | 1/2018 | Ding et al. |
| 2018/0034779 A1 | 2/2018 | Ahuja et al. |
| 2018/0063190 A1 | 3/2018 | Wright et al. |
| 2018/0096153 A1 | 4/2018 | Dewitte et al. |
| 2018/0115573 A1 | 4/2018 | Kuo et al. |
| 2018/0165452 A1 | 6/2018 | Sun et al. |
| 2018/0268464 A1 | 9/2018 | Li |
| 2018/0307832 A1 | 10/2018 | Ijiro et al. |
| 2018/0309787 A1 | 10/2018 | Evron et al. |
| 2018/0365420 A1 | 12/2018 | Krylov et al. |
| 2019/0005239 A1 | 1/2019 | Park et al. |

(56) References Cited

U.S. PATENT DOCUMENTS

| | | | |
|---|---|---|---|
| 2019/0089737 | A1 | 3/2019 | Shayevitz et al. |
| 2019/0114423 | A1 | 4/2019 | Chistyakov et al. |
| 2019/0158525 | A1 | 5/2019 | Rostami-Hesarsorkh et al. |
| 2019/0207973 | A1 | 7/2019 | Peng |
| 2019/0230098 | A1 | 7/2019 | Navarro |
| 2019/0373005 | A1 | 12/2019 | Bassett |
| 2020/0092306 | A1 | 3/2020 | Jusko et al. |
| 2020/0134702 | A1 | 4/2020 | Li |
| 2020/0302058 | A1 | 9/2020 | Kenyon et al. |

FOREIGN PATENT DOCUMENTS

| | | | | |
|---|---|---|---|---|
| CN | 104504307 | A | | 4/2015 |
| CN | 103020494 | B | | 6/2015 |
| CN | 105429956 | A | | 3/2016 |
| CN | 105897714 | A | | 8/2016 |
| CN | 106131016 | A | | 11/2016 |
| CN | 106506435 | A | | 3/2017 |
| CN | 106713312 | A | | 5/2017 |
| CN | 107392019 | A | | 11/2017 |
| CN | 107392456 | A | | 11/2017 |
| EP | 1160646 | A2 | | 12/2001 |
| EP | 2916256 | A1 | | 9/2015 |
| EP | 2410452 | B1 | | 1/2016 |
| EP | 2743854 | B1 | | 12/2018 |
| EP | 2946331 | B1 | | 8/2019 |
| GB | 2425622 | A | * 11/2006 | ........... G06F 9/5072 |
| GB | 2493514 | A | | 2/2013 |
| KR | 10-2007-0049514 | A | | 5/2007 |
| KR | 10-1514984 | B1 | | 4/2015 |
| RU | 91213 | U1 | | 1/2010 |
| RU | 2382400 | C2 | | 2/2010 |
| RU | 107616 | U1 | | 8/2011 |
| RU | 2446459 | C1 | | 3/2012 |
| RU | 129279 | U1 | | 6/2013 |
| RU | 2487406 | C1 | | 7/2013 |
| RU | 2488880 | C1 | | 7/2013 |
| RU | 2495486 | C1 | | 10/2013 |
| RU | 2522019 | C1 | | 7/2014 |
| RU | 2523114 | C2 | | 7/2014 |
| RU | 2530210 | C2 | | 10/2014 |
| RU | 2536664 | C2 | | 12/2014 |
| RU | 2538292 | C1 | | 1/2015 |
| RU | 2543564 | C1 | | 3/2015 |
| RU | 2566329 | C2 | | 10/2015 |
| RU | 2571594 | C2 | | 12/2015 |
| RU | 2580036 | C2 | | 4/2016 |
| RU | 2589310 | C2 | | 7/2016 |
| RU | 164629 | U1 | | 9/2016 |
| RU | 2607231 | C2 | | 1/2017 |
| RU | 2610586 | C2 | | 2/2017 |
| RU | 2613535 | C1 | | 3/2017 |
| RU | 2622870 | C2 | | 6/2017 |
| RU | 2625050 | C1 | | 7/2017 |
| RU | 2628192 | C2 | | 8/2017 |
| RU | 2636702 | C1 | | 11/2017 |
| RU | 2654146 | C1 | | 5/2018 |
| RU | 2670906 | C9 | | 12/2018 |
| RU | 2681699 | C1 | | 3/2019 |
| RU | 2702269 | C1 | | 10/2019 |
| RU | 2706883 | C1 | | 11/2019 |
| RU | 2706896 | C1 | | 11/2019 |
| RU | 2708356 | C1 | | 12/2019 |
| RU | 2728497 | C1 | * 7/2020 | ............. G06F 21/14 |
| RU | 2728497 | C1 | | 7/2020 |
| RU | 2728498 | C1 | * 7/2020 | ............. G06F 21/53 |
| RU | 2738344 | C1 | * 12/2020 | ............. G06F 21/53 |
| WO | 0245380 | A2 | | 6/2002 |
| WO | 2009/026564 | A1 | | 2/2009 |
| WO | 2011/045424 | A1 | | 4/2011 |
| WO | 2012/015171 | A2 | | 2/2012 |
| WO | 2017/111835 | A1 | | 6/2017 |
| WO | 2019/010182 | A1 | | 1/2019 |

OTHER PUBLICATIONS

Phuong, "On Preempting Advanced Persistent Threats Using Probabilistic Graphical Models", arxiv.org, Cornell University Library, 201 Olin Library Cornell University Ithaca, NY 14853, Mar. 2019, pp. 1-14.

Manuel et al., "A survey on automated dynamic malware-analysis techniques and tools", ACM Computing Surveys, vol. 44, No. 2, Feb. 2012, pp. 1-49.

Tokhtabayev et al., "Malware Analysis and Detection via Activity Trees in User-Dependent Environment", Aug. 2017, ICIAP: International Conference on Image Analysis and Processing, 17th International Conference, Naples, Italy, Sep. 9-13, 2013. Proceedi Ngs; [Lecture Notes in Computer Science; Lect.Notes Computer], Springer, Berlin, Heidelberg, pp. 211-222.

Grant Decision and Search Report with regard to the RU Patent Application No. 2019139628 completed Jun. 26, 2020.

Search Report with regard to the RU Patent Application No. 2020126232 completed Jan. 28, 2021.

Rudman et al., "Dridex: Analysis of the traffic and automatic generation of IOCs", IEEE, 2016, https://digifors.cs.up.ac.za/issa/2016/Proceedings/Full/paper%2041.pdf, pp. 77-84.

Github / Linguist, https://github.com/github/linguist accessed on Sep. 24, 2021, pdf 6 pages.

Blackducksoftware / Ohcount, https://github.com/blackducksoftware/ohcount accessed on Sep. 24, 2021, pdf 4 pages.

Search Report with regard to RU Patent Application No. 2021108261 completed Feb. 28, 2022.

English Abstract for RU91213 retrieved on Espacenet on Mar. 25, 2022.

English Abstract of RU107616 retrieved on Espacenet on Jul. 3, 2017.

European Search Report with regard to EP17180099 completed on Nov. 28, 2017.

European Search Report with regard to EP17191900 completed on Jan. 11, 2018.

Yoshioka et al., "Sandbox Analysis with Controlled Internet Connection for Observing Temporal Changes of Malware Behavior", https://www.researchgate.net/publication/254198606, 15 pages.

Yoshioka et al., "Multi-Pass Malware Sandbox Analysis with Controlled Internet Connection", IEICE Transactions on Fundamentals of Electronics, Communications and Computer Sciences, Engineering Sciences Society, Tokyo, 2010, vol. E93A, No. 1, pp. 210-218.

Wikipedia, "Blockchain", https://en.wikipedia.org/wiki/Blockchain, pdf document, 18 pages.

Search Report with regard to the counterpart RU Patent Application No. 2018101764 completed Jun. 29, 2018.

Search Report with regard to the counterpart RU Patent Application No. 2018101761 completed Jun. 20, 2018.

International Search Report with regard to the counterpart Patent Application No. PCT/RU2016/000526 dated Jun. 1, 2017.

Search Report with regard to the counterpart RU Patent Application No. 2018101760 completed Jun. 22, 2018.

Search Report with regard to the counterpart RU Patent Application No. 2018101759 completed Sep. 7, 2018.

English Abstract of RU129279 retrieved on Espacenet on Sep. 11, 2017.

English Abstract of RU164629 retrieved on Espacenet on Sep. 11, 2017.

English Abstract of RU2538292 retrieved on Espacenet on Sep. 11, 2017.

Prakash et al., "PhishNet: Predictive Blacklisting to Detect Phishing Attacks", INFOCOM, 2010 Proceedings IEEE, USA, 2010, ISBN: 978-1-4244-5836-3, doc. 22 pages.

Search Report with regard to the counterpart Patent Application No. RU2018105377 completed Oct. 15, 2018.

Search Report with regard to the counterpart RU Patent Application No. 2018101763 completed Jan. 11, 2019.

Search Report with regard to the counterpart RU Patent Application No. 2016137336 completed Jun. 6, 2017.

English Abstract of RU2522019 retrieved on Espacenet on Jan. 25, 2019.

(56) References Cited

OTHER PUBLICATIONS

Search Report with regard to the counterpart RU Patent Application No. 2017140501 completed Jul. 11, 2018.
European Search Report with regard to the counterpart EP Patent Application No. EP17211131 completed Apr. 12, 2018.
European Search Report with regard to the counterpart EP Patent Application No. EP17210904 completed May 16, 2018.
Office Action with regard to the counterpart U.S. Appl. No. 15/707,641 dated Apr. 25, 2019.
English Translation of CN106713312, © Questel—FAMPAT, Jul. 17, 2019.
English Translation of CN105897714, © Questel—FAMPAT, Jul. 17, 2019.
English Translation of CN106506435, © Questel—FAMPAT, Jul. 26, 2019.
English Translation of CN107392456, © Questel—FAMPAT, Jul. 29, 2019.
English Translation of CN103491205, © Questel—FAMPAT, Jul. 29, 2019.
English Translation of CN106131016, © Questel—FAMPAT, Jul. 17, 2019.
Invitation to Respond to Written Opinion dated Aug. 5, 2019 with regard to the counterpart SG Patent Application No. 10201900339Q.
Invitation to Respond to Written Opinion dated Aug. 5, 2019 with regard to the counterpart SG Patent Application No. 10201901079U.
Invitation to Respond to Written Opinion dated Jul. 31, 2019 with regard to the counterpart SG Patent Application No. 10201900335P.
Search Report with regard to the counterpart RU Patent Application No. 2018144708 completed Aug. 16, 2019.
English Translation of KR10-2007-0049514 (Description, Claims) retrieved on Espacenet on Oct. 16, 2019.
Search Report with regard to the counterpart RU Patent Application No. 2018147431 completed Aug. 15, 2019.
English Abstract of KR10-1514984 retrieved on Espacenet on Oct. 15, 2019.
Office Action with regard to the counterpart U.S. Appl. No. 16/261,854 dated Oct. 21, 2019.
Notice of Allowance with regard to the counterpart U.S. Appl. No. 15/707,641 dated Oct. 30, 2019.
Whyte, "DNS-based Detection of Scanning Worms in an Enterprise Network", Aug. 2004, NOSS, pp. 1-17 {Year 2005)—cited by Examiner in the Notice of Allowance with regard to the counterpart U.S. Appl. No. 15/707,641.
Office Action with regard to the counterpart U.S. Appl. No. 15/858,013 dated Nov. 22, 2019.
Search Report with regard to the counterpart SG Patent Application No. 10201900062S dated Dec. 5, 2019.
Search Report with regard to the counterpart SG Patent Application No. 10201900060Y dated Dec. 5, 2019.
English Abstract for CN105429956 retrieved on Espacenet on Jan. 7, 2020.
English Abstract for CN104504307 retrieved on Espacenet on Jan. 7, 2020.
Office Action received with regard to the counterpart U.S. Appl. No. 15/858,032 dated Apr. 6, 2020.
Notice of Allowance with regard to the counterpart U.S. Appl. No. 15/858,013 dated May 8, 2020.
Office Action with regard to the counterpart U.S. Appl. No. 16/270,341 dated May 27, 2020.
Notice of Allowance with regard to the counterpart U.S. Appl. No. 15/858,013 dated Jun. 10, 2020.
Office Action with regard to the counterpart U.S. Appl. No. 16/249,004 dated Apr. 23, 2021.
Grant Decision with regard to the counterpart RU Patent Application No. 2019139630 dated Jun. 26, 2020.
Dauber et al., "Stylometric Authorship Attribution in Collaborative Documents", Materials of International Conference on Cyber Security Cryptography and Machine Learning (CSCML) 2017, pp. 115-135.
Afroz, "Deception in Authorship Attribution", Drexel University, 2013, http://hdl.handle.net/1860/4431, pp. 1-91.
Granin, "Text Analyzer", https://habr.com/ru/post/114186/ and Machine Translation into English by Yandex Translate on Oct. 21, 2020, pdf 32 pages.
"Authorship Attribution Program by NeoNeuro", https://neoneuro.com accessed Oct. 21, 2020, pdf 5 pages.
"Tools for Software Analysis and Forensic Engineering, S.A.F.E.", https://www.safe-corp.com/index.htm accessed Oct. 21, 2020, pdf 2 pages.
English Abstract for CN 103020494 retrieved on Espacenet on Oct. 21, 2020.
Search Report with regard to RU Patent Application No. 2020110068 completed Sep. 8, 2020.
International Search Report with regard to PCT/RU2020/000140 dated Nov. 19, 2020.
Search Report with regard to RU Patent Application No. 2020107922 completed Mar. 24, 2020.
International Search Report with regard to PCT/RU2020/000089 dated Oct. 29, 2020.
English Abstract for CN107392019 retrieved on Espacenet on Dec. 2, 2021.
Notice of Allowance with regard to the U.S. Appl. No. 17/087,775 dated Nov. 15, 2021.

* cited by examiner

```
...
    post (retcmd, content);
  }catch(err){
  } function disableSecurity () {
  if(WScript.Arguments.Named.Exists("elevated") = true) {
    var oReg = GetObject("winmgmts: (impersonationLevel=impersonate)!\\\\.\\root\\default:StdRegProv");
      oReg.SetDwordValue(0x80000002, "SOFTWARE\\Microsoft\\Windows\\CurrentVersion\\Policies\\System",
"EnableLUA", 0);
      oReg.SetDwordValue(0x80000002, "SOFTWARE\\Microsoft\\Windows\\CurrentVersion\\Policies\\System",
"ConsentPrompt", 0);
      oReg = null;
  }
} curDir = CreateObject("Scripting.FileSystemObject").GetParentFolderName(WScript.ScriptFullName)

Function chr(code){
  return String.fromCharCode(code);
}

Function gsp(path){
  return filesystemobj.getFile(path).shortPath;
}

Set objhtml = CreateObject("htmlfile")
ClipboardText = objHTML.ParentWindow.ClipboardData.GetData("text")
...
```

```
...
if(WScript.Arguments.Named.Exists("elevated") = true) {
    var oReg = GetObject("winmgmts: (impersonationLevel=impersonate)!\\\\.\\root\\default:StdRegProv");
    oReg.SetDwordValue(0x80000002, "SOFTWARE\\Microsoft\\Windows\\CurrentVersion\\Policies\\System", "EnableLUA", 0);
    oReg.SetDwordValue(0x80000002, "SOFTWARE\\Microsoft\\Windows\\CurrentVersion\\Policies\\System", "ConsentPrompt", 0);
    oReg = null;
}
...
return String.fromCharCode(code);
return filesystemobj.getFile(path).shortPath;
```

251 — if block
252 — return String.fromCharCode(code);
253 — return filesystemobj.getFile(path).shortPath;

```
...
if(WScript.Arguments.Named.Exists("elevated") = true) {
    var oReg = GetObject("winmgmts: (impersonationLevel=impersonate)!\\\\.\\root\\default:StdRegProv");
    oReg.SetDwordValue(0x80000002, "SOFTWARE\\Microsoft\\Windows\\CurrentVersion\\Policies\\System", "EnableLUA", 0);
    oReg.SetDwordValue(0x80000002, "SOFTWARE\\Microsoft\\Windows\\CurrentVersion\\Policies\\System", "ConsentPrompt", 0);
    oReg = null;
}
...
return filesystemobj.getFile(path).shortPath;
```

```
...
if(WScript.Arguments.Named.Exists("elevated") = true) { var oReg = GetObject("winmgmts:{impersonationLevel=impersonate}!\\\\.\\root\\default:StdRegProv");

oReg.SetDwordValue(0x80000002, "SOFTWARE\\Microsoft\\Windows\\CurrentVersion\\Policies\\System", "EnableLUA", 0);

oReg.SetDwordValue(0x80000002, "SOFTWARE\\Microsoft\\Windows\\CurrentVersion\\Policies\\System", "ConsentPrompt", 0);

oReg = null;

return filesystemobj.getFile(path).shortPath;
...
```

FIG. 2D

```
...
if(WScript.Arguments.Named.Exists("elevated") = true) { var oReg = GetObject("winmgmts:{impersonationLevel=impersonate}!\\\\.\\root\\default:StdRegProv");

oReg.SetDwordValue(0x80000002, "SOFTWARE\\Microsoft\\Windows\\CurrentVersion\\Policies\\System", "EnableLUA", 0);

oReg.SetDwordValue(0x80000002, "SOFTWARE\\Microsoft\\Windows\\CurrentVersion\\Policies\\System", "ConsentPrompt", 0);

oReg = null;

return filesystemobj.getFile(path).shortPath;
...
```

FIG. 2E

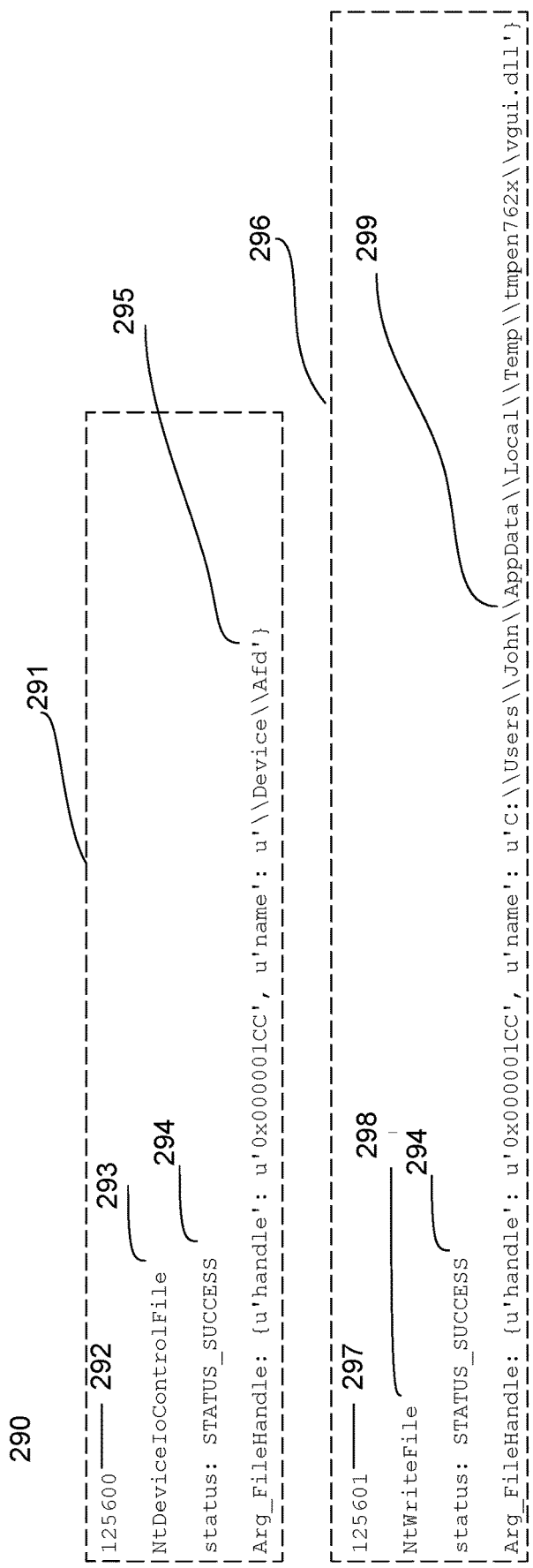

METHOD AND SYSTEM FOR DETERMINING AFFILIATION OF SOFTWARE TO SOFTWARE FAMILIES

CROSS-REFERENCE

The present application claims priority to Russian Patent Application No. 2019139630, entitled "METHOD AND SYSTEM FOR DETERMINING AFFILIATION OF SOFTWARE TO SOFTWARE FAMILIES," filed on Dec. 5, 2019, the entirety of which is incorporated herein by reference.

TECHNICAL FIELD

The present technology broadly relates to the field of computer technology; and, in particular, to methods and systems for determining affiliation of software to predetermined software families and/or authorships.

BACKGROUND

As it may be known, professional cybercriminals thoroughly elaborate an attack strategy and change it rarely, using the same malware for a long time with insignificant modifications.

At the same time, the developers of malicious SW (MSW) creating tools for cybercriminals could use the same software solution, for example, a function implementing cryptographic algorithm, for a long time in different samples of MSW created for different cybercriminal groups and associated with different MSW families.

Therefore, in the field of cyber security, it may be important to know with which MSW family a given sample of MSW is affiliated and/or who is an author (or a group thereof) of the given sample of MSW.

Signature analysis is a well-known method of MSW detection. This method is based on the search of a unique sequence of bytes in files including source code of MSW, i.e. signature which is indicative of a specific MSW. A respective signature associated with the given sample of MSW may be determined based on analyzing a source code associated therewith. Further, the respective signature can be stored into a virus signature database, to which an antivirus program may be provided access, thereby allowing for detection of the given sample of MSW.

However, this method is also well-known to cybercriminals. Therefore, nearly all types of modern MSW are constantly modified to change basic functionality thereof. As a result of such modifications, the files of a next version of the given MSW may acquire new properties, which may render the given MSW unrecognizable for antivirus signature analyzers as malicious, which may thus allow cybercriminals to conduct attacks without any obstacles.

Besides the modifications, various approaches of obfuscation are widely used. Broadly speaking, in the context of the present specification, "obfuscation" refers to a technique of modifying a source code of the given MSW such that functionality thereof is preserved, however, analyzing it to determine operation algorithms becomes more complicated. The above-mentioned modifications to the given MSW could be performed either by a human or automatically, e.g. by so called polymorphic generator, which may be part of a malware.

At the same time, as a result of the obfuscation, operating functions of the given MSW are not significantly altered. For example, after the modification the given MSW will "look" differently only for signature analyzers, its code could be obfuscated and hence cannot be analyzed by a human; however, a set of operating functions of the given MSW performed before the obfuscation is likely to remain unchanged thereafter.

Certain prior art approaches are directed to determining authorship of different types of texts, such as literary, publicistic, or scientific based on stylometric analysis thereof.

An article written by Dauber et al., published by Drexel University, Philadelphia, USA, and entitled "*Stylometric Authorship Attribution in Collaborative Documents*", discloses applying stylometry to a novel dataset of multi-authored documents collected from Wikia using both relaxed classification with a support vector machine (SVM) and multi-label classification techniques. Five possible scenarios are defined that show that one, the case where labeled and unlabeled collaborative documents by the same authors are available, yields high accuracy on the dataset while the other, more restrictive cases yield lower accuracies. Based on the results of these experiments and knowledge of the multi-label classifiers used, there is proposed a hypothesis to explain this overall poor performance. Additionally, there is performed authorship attribution of pre-segmented text from the Wikia dataset showing that while this performs better than multi-label learning it requires large amounts of data to be successful.

A PhD thesis written by S. Afroz at Drexel University, Philadelphia, USA, and entitled "*Deception In Authorship Attribution*" discloses authorship attribution methods in adversarial settings where authors take measures to hide their identity by changing their writing style and by creating multiple identities; using a large feature set to distinguish regular documents from deceptive documents with high accuracy and present an analysis of linguistic features that can be modified to hide writing style; adapting regular authorship attribution to difficult datasets such as leaked underground forum; and presenting a method for detecting multiple identities of authors. Further, demonstrating the utility of the approach with a case study that includes applying the technique to an underground forum and manual analysis to validate the results, enabling the discovery of previously undetected multiple accounts.

An article written by Alexander Granin, published by the web resource habr.com, and entitled "*Text Analyzer*" appears to disclose an automatic approach to determining authorship of texts based on Hamming Neural Network.

SUMMARY

Developers of the present technology have realized that the stylometric approaches, i.e. those based on analyzing text stylistics, for determining program code authorship, may not be an optimal solution. Regardless of the programming language in which the code is written, defining the author style in it would be extremely difficult by reason of the specific nature of the art. In cases, when the program source code is obfuscated, use of the stylometric approaches for samples of MSW analysis is not likely to bring expected results.

Therefore, non-limiting embodiments of the present technology are directed to methods and systems for determining affiliation of given software to a predetermined family of software and/or authorship based on specific features associated therewith that are derived from a source code thereof. It should be expressly understood that the method and systems described herein are not limited to MSW and may be used for any software.

More specifically, according to a first broad aspect of the present technology, there is provided a method for determining an affiliation of a given software with target software. The method is executable by a processor. The method comprises: receiving, by the processor, a software source code of the given software; determining, by the processor, reference data associated with software source code; parsing, by the processor, based on the reference data associated with software source code, the software source code to identify therein at least one function, the identifying comprising identifying, in the software source code, library functions and deleting the library function by applying, by the processor, a signature analysis to the software source code; parsing, by the processor, the at least one function to identify therein at least one function command, the at least one function command comprising a respective action and at least one argument associated with the at least one action; generating, by the processor, for the at least one function, based on the respective action and the at least one argument thereof, a respective one of a plurality of function identifiers associated with the given software, the generating comprising applying, by the processor, a hash function to the respective action and to each value of the at least one argument associated therewith to generate respective hash function values; and aggregating the respective hash function values; aggregating, by the processor, the plurality of function identifiers associated with the given software into an aggregated array of function identifiers given an order of occurrence of associated functions within the software source code; applying, by the processor, at least one classifier to the aggregated array of function identifiers associated with the given software to determine a likelihood parameter indicative of the given software being affiliated to a respective target software, the at least one classifier having been trained to determine the affiliation with the respective target software; in response to the likelihood parameter being equal to or greater than a predetermined likelihood parameter threshold: identifying the given software as being affiliated to the respective target software; storing data indicative of the given software in a database of affiliated software; and using the data indicative of the given software for further determining affiliation to the given target software.

In some implementations of the method, the identifying the library functions further comprises identifying, in the software source code, source code portions inherently non-indicative of the affiliation to the target software, and deleting the source code portions inherently non-indicative of the affiliation to the target software from the software source code.

In some implementations of the method, the applying the hash function further comprises applying a first hash function to the respective action and applying a second hash function to the at least one argument, the second hash function being different from the first hash function.

In some implementations of the method, the generating the respective one of the plurality of identifiers further comprises applying a serialization process to the at least one action and the at least one argument associated therewith.

According to a second broad aspect of the present technology, there is provided a method for training a classifier to determine an affiliation with a given target software. The method is executable by a processor. The method comprises: receiving, by the processor, a plurality of target software source codes associated with the given target software; determining, by the processor, for each one of the plurality of target software source codes, respective reference data; identifying, by the processor, in each one of the plurality of target software source codes, based on the respective reference data, at least one target function; parsing, by the processor, the at least one target function to identify therein at least one target function command; generating, by the processor, based on each of the at least one target function command, a respective target function identifier associated with the at least one target function, the respective target function identifier comprising an associated number sequence; aggregating, by the processor, number sequences associated with respective target functions over the plurality of target software source codes, thereby generating a number array associated with the respective target software; identifying, by the processor, in the number array associated with the given target software, at least one pattern, wherein: the at least one pattern comprises a predetermined repetitive number sequence within the number array, and the predetermined repetitive number sequence is indicative of a frequency of occurrence of at least one associated target function command within the respective target software; storing the at least one pattern, thereby generating a training set of data, the training set of data comprising a plurality of patterns, a given pattern of the plurality of patterns including a respective label being indicative of an association between the given pattern and the given target software; training the classifier, based on the training set of data, to determine the affiliation of a given software to the given target software.

In some implementations of the method, the identifying the at least one target function further comprises identifying, in each of the plurality of software source codes, library functions and deleting the library functions.

In some implementations of the method, wherein the identifying the library functions further comprises identifying, in each of the plurality of software source codes, source code portions inherently non-indicative of the affiliation to the target software, and deleting the source code portions inherently non-indicative of the affiliation to the given target software from each of the plurality of software source codes.

In some implementations of the method, wherein the at least one target function command comprises at least one action and at least one argument associated with the at least one action; and the generating the respective target function identifier further comprises: applying a hash function to the at least one action and to each value of the at least one argument to generate respective hash function values, each one of the respective hash function values being a respective number sequence; and concatenating the respective hash function values.

In some implementations of the method, the target software is associated with at least one of: a predetermined software family, and a predetermined authorship.

In some implementations of the method, the method further comprises determining a frequency occurrence value associated with the at least one pattern, the determining being according to the following formula:

$$\lambda = \frac{L}{K},$$

where L is a frequency of occurrence of the at least one pattern within the number array associated with the respective target software, and K is a number of software source codes in the plurality of software source codes associated with the respective target software used for generating the training set of data.

In some implementations of the method, the method further comprises assigning a weight value to the at least one pattern.

In some implementations of the method, the weight value is further determined based on the frequency of occurrence value associated with the at least one pattern.

According to a third broad aspect of the present technology, there is provided a method for determining an affiliation of a given software with target software. The method is executable by a processor, The method comprises: receiving, by the processor, a software source code of the given software; executing, by the processor, the software source code in an isolated program environment to identify at least one of a plurality of outgoing requests of the given software, the at least one of the plurality of outgoing requests comprising a respective action and at least one argument associated with the respective action; and generating, for the at least one of the plurality of outgoing requests, based on the respective action and the at least one argument, a respective one of a plurality of identifiers associated with the given software; aggregating, by the processor, the plurality of identifiers associated with the given software into an aggregated array of identifiers given a time order of identifying associated outgoing requests; applying, by the processor, at least one classifier to the aggregated array of identifiers to determine a likelihood parameter indicative of the given software being affiliated to a respective target software; in response to the likelihood parameter being equal to or greater than a predetermined likelihood parameter threshold: identifying the given software as being affiliated to the respective target software; storing data indicative of the given software in a database of affiliated software; and using the data indicative of the given software for further determining affiliation to the respective target software.

In some implementations of the method, the receiving the software source code further comprises identifying therein source code portions inherently non-indicative of the affiliation to the target software, and deleting the source code portions inherently non-indicative of the affiliation to the target software from the software source code.

In some implementations of the method, the generating the respective one of the plurality of identifiers further comprises: applying a hash function to the respective action and to each value of the at least one argument associated with the at least one of the plurality of outgoing requests to generate respective hash function values, each one of the respective hash function values being a respective number sequence; concatenating the respective hash function values.

In some implementations of the method, the applying the hash function further comprises applying a first hash function to the respective action and applying a second hash function to the at least one argument, the second hash function being different from the first hash function.

In some implementations of the method, the generating the respective one of the plurality of identifiers further comprises applying a serialization process to the at least one action and the at least one argument associated therewith.

In some implementations of the method, the respective target software is associated with at least one of: a predetermined software family, and a predetermined authorship.

In some implementations of the method, the at least one classifier has been trained to determine the affiliation to the respective target software based on a training set of data, and the method further comprising generating the training set of data, the generating comprising: receiving, by the processor, a plurality of target software source codes associated with the respective target software; executing, by the processor, a given one of the plurality of target software source codes in the isolated program environment to identify at least one of a respective plurality of target outgoing requests of the respective target software, the at least one of the respective plurality of outgoing requests comprising a respective target action and at least one target argument associated with the respective target action; generating, for the at least one of the respective plurality of target outgoing requests, based on the respective target action and the at least one target argument, a respective one of a respective plurality of target identifiers associated with the respective target software; aggregating, by the processor, target identifiers associated with the respective target software over respective pluralities of target identifiers into an aggregated array of target identifiers given a time order of identifying associated target outgoing requests; identifying, by the processor, in the aggregated array of target identifiers associated with the respective target software, at least one pattern, wherein: the at least one pattern comprises a predetermined repetitive sequence of a given target identifier within the aggregated array of target identifiers, and the predetermined repetitive sequence of the given target identifier is indicative of a frequency of the respective target software executing the respective target action in the isolated program environment; storing the at least one pattern with a label indicative of an association between the at least one pattern and the respective target software for inclusion thereof into the training set of data.

In some implementations of the method, a length of the predetermined repetitive sequence is determined as a constant number.

In some implementations of the method, the length of the predetermined repetitive sequence is further determined iteratively, based on a current number thereof within the aggregated array of target identifiers.

In some implementations of the method, the method further comprises determining a frequency occurrence value associated with the at least one pattern, the determining being according to the following formula:

$$\lambda = \frac{L}{K},$$

where L is a frequency of occurrence of the at least one pattern within the aggregated array of target identifiers associated with the respective target software, and K is a number of software source codes in the plurality of software source codes associated with the respective target software used for generating the training set of data.

In some implementations of the method, the method further comprises assigning a weight value to the at least one pattern.

In some implementations of the method, the weight value is indicative of a type of the respective action associated with the at least one of the plurality of outgoing requests of the respective target software.

In some implementations of the method, the weight value is further determined based on the frequency of occurrence value associated with the at least one pattern.

According to a fourth broad aspect of the present technology, there is provided a system for determining an affiliation of a given software with target software. The system comprises a computer device comprising: a processor, a non-volatile memory storing instructions; the processor, upon execution of the instructions, being configured to execute one of the methods in accordance with the above aspects of the present technology.

Within the context of this description, unless expressly stated otherwise, the below-listed terms mean as follows:

Platform or computer platform is an environment where a given piece of software is executed. The platform includes both hardware (e.g. random-access memory, hard disk) and software (BIOS, operating system, etc.). Non-limiting example of a platform may be a Win32 API platform.

Obfuscation or code obfuscation is deliberate modifying an initial source code of a software program such that it is difficult for humans to understand, while preserving its functionality.

Logging is automatic recording actions performed by a software program in chronological order into a specific file, which may be referred to as a log or a report.

Regular source code portions are code snippets, which could be found in a variety of programs associated with a specific type of software. Such source code portions are used not only in software of specified purpose or by a certain author but practically ubiquitously. Example of regular source code portions includes, without being limited to, function prologues.

Framework is a program platform defining a structure of a program system—for example, a Django framework.

Further, in the context of the present specification, unless expressly provided otherwise, a computer system may refer, but is not limited to, an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

BRIEF DESCRIPTION OF THE DRAWINGS

Non-limiting embodiments of the present technology are described herein with reference to the accompanying drawings; these drawings are only presented to explain the essence of the technology and are not limiting the scope thereof in any way, where:

FIGS. 2A to 2F schematically depict stages of processing a software source code of the given software for generating specific features for determining the affiliation of the given software to the target software, in accordance with certain non-limiting embodiments of the present technology;

DETAILED DESCRIPTION

The following detailed description is provided to enable anyone skilled in the art to implement and use the non-limiting embodiments of the present technology. Specific details are provided merely for descriptive purposes and to give insights into the present technology, and in no way as a limitation. However, it would be apparent to a person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

Certain non-limiting embodiments of the present technology are directed to computer-implemented methods and systems for determining affiliation of given software to target software based on analyzing an associated software source code. In some non-limiting embodiments of the present technology the target software may include software of a predetermined software family and/or of a predetermined authorship.

According to certain non-limiting embodiments of the present technology, each one of the methods described herein below can be executed by a hardware processor—for example, a processor 501 of a computing device 500, which will be described below with reference to FIG. 5.

Determining Affiliation to Target Software

Figure 1A:
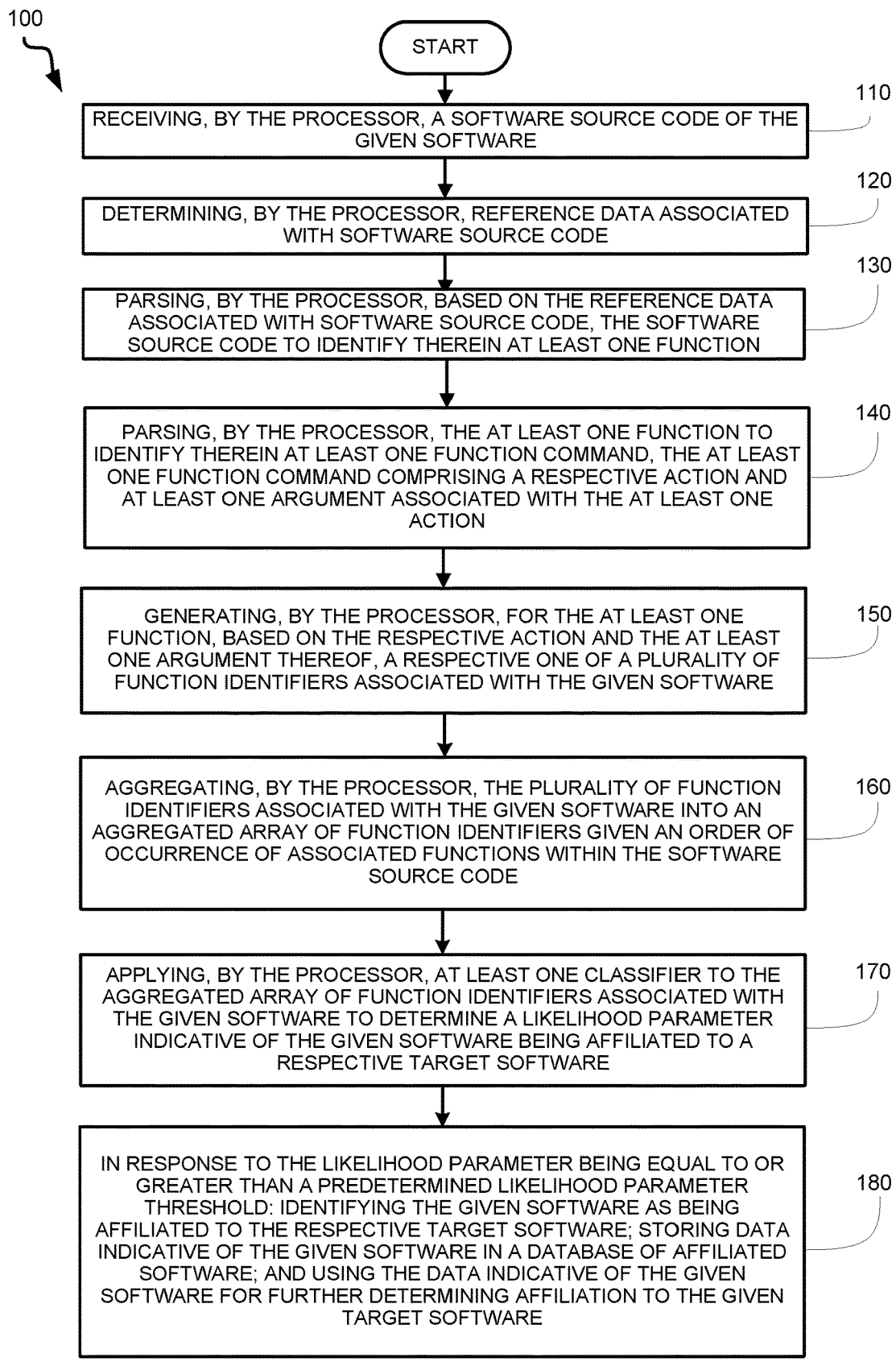
FIGS. 1A and 1B respectively depict flowchart diagrams of methods for determining an affiliation of a given software to a target software, in accordance with certain non-limiting embodiments of the present technology.

With reference to FIG. 1, there is depicted a flowchart diagram of a first method 100 for determining the affiliation of the given software with the target software, in accordance with certain non-limiting embodiments of the present technology.

Step 110: Receiving, by the Processor, a Software Source Code of the Given Software The first method 100 commences at the step 110 where the processor 501 can be configured to receive a file containing a software source code of the given software for further analysis. According to certain non-limiting embodiments of the present technology, the file containing the software source code can be of various formats including, for example, without limitation, a *.cpp file format, a *.bas file format, as a project developed in one of a modern visual development environments, such as Visual Studio, and the like.

In some non-limiting embodiments of the present technology, if the given software is associated with a plurality of interrelated files (for example, it is a project in one of modern visual development environments), the processor 501 can be configured to select therefrom only files containing the software source code. For example, if the project has been created in C/C++ programming language, the files containing the software source code can be *.cpp files; if the project has been created in assembler language, the files containing the software source code can be *.asm files, etc. The files containing the software source code of the given software could be selected, by the processor 501 using any method, and in some non-limiting embodiments of the present technology, by a script, which copies all project files with the above-specified extension into an input folder of the computing environment 500 implementing the first method 100.

The first method 100 thus advances to step 120.

Step 120: Determining, by the Processor, Reference Data Associated with Software Source Code According to certain non-limiting embodiments of the present technology, at step 120, the processor 501 can be configured to analyze the software source code of the given software to determine certain reference data associated therewith. In some non-limiting embodiments of the present technology, the reference data may include a program platform and a programming language used to develop the software source code of the given software. In these embodiments, the platform could be determined, for example, by any known method. by brute-force searching; and the programming language could be determined, for example, by one of: a Linguist program (github.com/github/linguist) and by an Ohcount program (github.com/blackducksoftware/ohcount).

With reference to FIG. 2A, there depicted a snippet 200 of the software source code of the given software, in accordance with certain non-limiting embodiments of the present technology. Analyzing the snippet 200 by the Linguist program, the processor 501 can be configured to determine that the software source code has been developed for the Win32 platform, in the JavaScript programming language.

According to certain non-limiting embodiments of the present technology, the processor 501 can be configured to conduct further analysis of the software source code using a function parser specifically preconfigured for the programming language, in which the software source code has been written. Thus, in the example of FIG. 2A, the function parser, whose algorithm is based on JavaScript syntax, can be used for further analysis of the software source code.

The first method 100 hence advances to step 130.

Step 130: Parsing, by the Processor, Based on the Reference Data Associated with Software Source Code, the Software Source Code to Identify Therein at Least One Function At step 130, using the function parser, the processor 501 can be configured to parse the software source code to identify therein at least one function and save it in a list of functions associated with the given software.

In the context of the present specification, the term "function" is to denote a portion of the software source code, which could be accessed within the software source code by reference thereto. In most cases, an identifier can be linked to a given function; however, many languages allow for anonymous functions. The address of the first (operator) instruction, being part of the given function, to which the control is passed when referring to the function, is inseparably associated with a name of the function. Having executed the given function, the control is returned back to a return address, i.e., to that portion of the software source code, from where the given function was called.

Thus, using the function parser, the processor 501 can be configured to determine boundaries, within portions of the software source code, which are associated with the functions within the software source code. For this purpose there could be used, for example, the commonly-known fact that, in the majority of high level programming languages, a function body of the given function is enclosed within a block operator (such as brackets, parentheses, and the like). Accordingly, in some non-limiting embodiments of the present technology, one of possible function parser operation algorithms of the function parser could include (1) detecting, in the software source code, pairs of words and/or symbol corresponding to a given block operator of the determined programming language, (2) verifying that the content within the block operator is the function body of the given function, and (3) storing the function body into a dedicated file of parsing results. In some non-limiting embodiments of the present technology, the verifying that the content within the block operator is the function body could be executed, for example, by searching, on the string preceding opening of the block operator, a symbolic expression corresponding to a function name in the syntax of the determined programming language.

In alternative non-limiting embodiments of the present technology, if the software source code is one of C-like programming languages, that is, for example, JavaScript, each function would begin with a function header having a predetermined format. In the example of FIG. 2A, in the snippet 200 written in the JavaScript programming language, the function header could be identified by a key word "function" as labelled by numerals 210, 220, and 230. Each function header in the snippet 200 is followed by a respective function body, also enclosed in the block operator, which is, in this example, denoted by a pair of curly braces: {and}. For example, in FIG. 2A the block operator is formed by braces 212 and 214, 222 and 224, 232 and 234. Accordingly, in this example, the processor 501 can be configured to identify the function headers, and subsequently, save portions of the software source code within the respective block operators following thereafter, into the list of functions associated with the given software. By so doing, the processor 501 may be configured to generate a list 250 depicted in FIG. 2B, according to certain non-limiting embodiments of the present technology. In the example of FIG. 2B, the list 250 includes portions of the software source code of a first function 251, a second function 252, and a third function 252.

Further, in some-non-limiting embodiments of the present technology, operations on remaining portions of the software source code of the given software beyond the block operators (i.e. the function boundaries) can be performed depending on whether the syntax of the programming language allows executing these portions. For example, in specific non-limiting embodiments of the present technology, if the software source code has been written in C or C#, the remaining portions thereof are ignored. In the example of FIGS. 2A to 2B, where the software source code has been developed in JavaScript, the remaining portions can be considered to be associated with another function, different from those having been previously determined by parsing. Such a function can be identified as a "main function" of the software source code and further processed analogously to all functions in the list 250. Thus, at step 130, the processor 501 can be configured to identify and obtain source code of the functions associated with the given software under analysis and save it the dedicated file.

Further, in some non-limiting embodiments of the present technology, the processor 501 may be further configured to identify, within the list 250 of functions associated with the given software, library functions and delete them therefrom. To that end, the processor 501 may be configured to apply a signature analysis. The library functions are the standard tools. They are widely used by a variety of programs, therefore, their presence in the software source code or in working processes is not specific to a certain software family and/or authorship. Excluding the library functions from the further analysis thus enables to significantly simplify the analysis and, at the same time, obtain better training results due to the fact that the decision rules are trained based on commands uniquely associated with the given software under analysis.

According to certain non-limiting embodiments of the present technology, the signature analysis and the deleting the library functions can be performed by the processor 501 executing an auxiliary script. An algorithm of the auxiliary script could represent, for example, a sequential comparison of each function within the list 250 with a prearranged set of signatures (regular expressions). Each of these signatures corresponds to a specific library function preliminarily described as a signature; when a function corresponding to any signature is detected, a whole portion of the software source code composing a function body and header of the function are deleted. Thus, in the example of FIG. 2B, from the list 250 of function associated with the software source code, the second function 252 can be identified as a library function and thus will be deleted. Upon completion of processing by the auxiliary script, the processor 501 can be configured to update the list 250 of functions, which after the deletion of the second function 252 has a view depicted in FIG. 2C, according to certain non-limiting embodiments of the present technology.

The first method 100 thus proceeds to step 140.

Step 140: Parsing, by the Processor, the at Least One Function to Identify Therein at Least One Function Command Referring back to FIG. 1A, at step 150, according to certain non-limiting embodiments of the present technology, the processor 501 can be configured to identify, within a given function associated with the given software, at least one function command. According to these embodiments, the at least one function command may be associated with a respective action of the given software. Further, the processor 501 may be configured to identify, within the at least one function command, at least one argument associated with the respective action. Moreover, in alternative non-limiting embodiments of the present technology, strings, consisting of one, two or three symbols, for example, can be excluded from further processing.

According to certain non-limiting embodiments of the present technology, a particular configuration of the at least one function command depends on the syntax of the programming language, in which the software source code under analysis has been written. Thus, in some non-limiting embodiments of the present technology, a beginning of the at least one function command can be a beginning of a given string, and an end of the at least one function command could thus be an end command symbol in the programming language. For example, in those embodiments where the programming language is the C programming language, the command ending symbol can comprise a semicolon (';'). In alternative non-limiting embodiments of the present technology, a predetermined symbol sequence located on a separate string could be considered as the at least one function command. Thus, for example, with reference to FIG. 2D, in an other portion 270 of the software source code each of strings thereof respectively numbered 271, 272, 273, 274, 275, and 276 can be considered to be the at least one function command.

According to certain non-limiting embodiments of the present technology, the processor 501 may be configured to identify the respective action associated with the at least one function command and at least one argument (if any) associated therewith by applying a command parser specifically preconfigured to be used with the programming language, that is based on the syntax thereof including a predetermined set of symbols for developing commands within the software source code.

The command parser can thus be configured for sequentially comparing strings within the software source code with a predetermined set of regular expressions corresponding to possible actions in the programming language. If none of the predetermined set of regular expressions corresponds to symbols of a given string under analysis, the given string is ignored. If the given string corresponds to a predetermined action, the command parser determines, in the given string, a presence of the at least one argument associated with the predetermined action, and further—its argument value.

A format of the at least one argument associated with the predetermined action, such as a decimal number, a symbol string in quotes, etc., is also defined by the syntax of the programming language and determined based by the one of the predetermined set of regular expression corresponding to the predetermined action. Thus, a given pair "action-argument" including the predetermined action and the at least one argument associated therewith can be saved in the file with the results. If the predetermined action is associated with the at least one argument having an improper format, the at least one argument can be assigned a zero value.

With reference to FIG. 2E, the following example pairs "action-argument" respectively numbered 281-282, 283-284, 285-286, and 287-288. In the depicted example, a given pair "action-argument" 289 includes an argument with the zero value. Further, as it may become apparent, a non-zero argument could include more than one value as, for example, arguments 282, 286, and 288.

The first method 100 thus advances to step 150.

Step 150: Generating, by the Processor, for the at Least One Function, Based on the Respective Action and the at Least One Argument Thereof, a Respective One of a Plurality of Function Identifiers Associated with the Given Software At step 150, according to certain non-limiting embodiments of the present technology, the processor 501 can be configured to generate, based on the pairs "action-argument" associated with the given function, a respective function identifier. To that end, the processor 501 may be configured to convert each pair "action-argument" associated with the given function associated with the given software into a respective number sequence, and concatenate respective number sequences associated with each of the pairs "action-argument" associated with the given function In various non-limiting embodiments of the present technology, the respective number sequence associated with a given pair "action-argument" can be represented as a decimal number, a hexadecimal number, a binary number, and the like.

According to certain non-limiting embodiments of the present technology, the generating the respective number sequence can include applying, by the processor 501, one or more hash functions to the given pair "action-argument". In some non-limiting embodiments of the present technology, the processor 501 may be configured to apply a first hash function to the respective action and a second hash function to the at least one argument associated therewith. In other non-limiting embodiments of the present technology, the first hash function can be different from the second hash function. Further, the number sequences obtained through the application of the one or more hash functions can be concatenated, thereby generating the respective number sequence associated with the given pair "action-argument". If the at least one argument includes more than one value, the one or more hash functions are applied to a string representing concatenated strings of all values of the at least one argument.

For example, in the depicted embodiments of FIGS. 2B and 2D, the first function 251 includes a first command 271, a second command 272, a third command 273, a fourth command 274, and a fifth command 275 of the first function 251. Further, the third function 253 includes a first command 276 of the third function 253.

Further, with reference to FIG. 2E, the first command 271 of the first function 251 includes a first given action 281 and a first associated argument 282; the second command 272 of the first function 251 includes a second given action 283 and a second associated argument 284; the third command 273 of the first function 251 includes a third given action 285 and a third associated argument 286; finally, the fourth command 274 of the first function 251 includes a fourth given action 287 and a fourth associated argument 288. The first command 276 of the third function 253 includes a fifth given action 289 and an associated argument having a zero value.

Further, as noted above, using the one or more hash functions, for example, the processor 501 can be configured to convert the first command 271 of the first function 251 into a first hexadecimal number:
21812f4d00522bd21c014228f948063b18de4875ffe533-b830f08a0326348a9160afafc8ada44db,
where c21812f4d00522bd21c014228f948063b18de487 is a result of taking the one or more hash functions from the first given action 281, and 5ffe533b830f08a032634-8a9160afafc8ada44db is a result of taking the one or more hash functions from the first associated argument 282.

Similarly, the second command 272 of the first function 251 can be converted into a second hexadecimal number:
70233cdf6b130df09a0fd4fd84f056e08b1cf51636c6f1-69e67d0cf02fc3433b2112402804d9a6a3;
the third command 273 of the first function 251 can be converted into a third hexadecimal number:
eef70649fc977965dabbe7516c55f7951a40ca1513be4d-3d8b43d0d4ecf268ff7c16fa7944139e99;
the fourth command 274 of the first function can be converted into a fourth hexadecimal number:
eef70649fc977965dabbe7516c55f7951a40ca1591c305-309bf156bb2da46a2fed619951c852dd45;
and the first command 276 of the third function 253 can be converted into a fifth hexadecimal number:
bd4ee045946f5de9bba8059a9304ae5539d6730d0b658-9fc6ab0dc82cf12099d1c2d40ab994e8410c.

In alternative non-limiting embodiments of the present technology, other approaches to converting the given pair "action-argument" pairs into the respective number sequence may be used. For example, the processor 501 can be configured to apply a serialization process before applying the one or more has functions to the at least one function command, which may allow saving information on an initial data type associated therewith. In this example, before hashing, a value associated with a given argument can be represented, for example, as a string, whose first byte codes an argument data type (such as integer, floating-point number, or zero, i.e. the zero argument), the second byte stores information about a string total length of the given argument, then a string of ASCII symbols associated with the given argument follows. Needless to mention that a given action may similarly be converted using the serialization process before hashing. For example, first, the processor 501 can be configured to convert, using the serialization process, the third given action 285 into the following string:
033E534f4654574152455c5c4d6963726f736f66745c5-c57696e646f77735c5c43757272656e74566572736-96f6e5c5c506f6c69636965735c5c53797374656d.

Second, the processor 501 can be configured to apply the one or more has function to the string above, thereby generating the following number sequence:
cc3c144bb04455bdaabcd9e199b1cdc9c5ed3d93b37b0-b533f5c9b18a4137bbd.

Accordingly, the processor 501 can further be configured to generate the following number sequence associated with the third associated argument 286, in a similar way:
ffa1ace8dba62cdbd33d8c09ad07e46ccb0da176eeaf4cc-67b4860c7d2bb53 1b.

Finally, as noted above, the processor 501 can be configured to concatenate the first hexadecimal number, the second hexadecimal number, the third hexadecimal number, and the fourth hexadecimal number respectively associated with the first command 271, the second command 272, the third command 273, and the fourth command 274 of the first function 251, thereby generating a first function identifier associated therewith:
c21812f4d00522bd21c014228f948063b18de4875ffe53-3b830f08a0326348a9160afafc8ada44db, 70233cdf6-b1 30df09a0fd4fd84f056e08b1cf51636c6f169e67d0-cf02fc3433b2112402804d9a6a3, eef70649fc977965d-abbe7516c55f7951a40ca1513be4d3d8b43d0d4ecf2-68ff7c16fa7944139e99, eef70649fc977965dabbe75-16c- 55f7951a40ca1591c305309bf156bb2da46a2fe-d619951c852dd45.

Similarly, the processor 501 can be configured to generate a third function identifier associated with the third function 253:
bd4ee045946f5de9bba8059a9304ae5539d6730d0b658-9fc6ab0dc82cf12099d1c2d40ab994e8410c.

Thus, in accordance with certain non-limiting embodiments of the present technology, each one of the first function 251 and the third function identified, by the processor 501, within the software source code associate with the given software, is respectively associated with the first function identifier and the third function identifier.

The first method 100 thus proceeds to step 160.

Step 160: Aggregating, by the Processor, the Plurality of Function Identifiers Associated with the Given Software into an Aggregated Array of Function Identifiers Given an Order of Occurrence of Associated Functions within the Software Source Code At step 160, in some non-limiting embodiments of the present technology, the processor 501 may be configured to aggregate the first function identifier and the third function identifier in an order of appearance of the first function 251 and the third function 253 within the list 250 associated with the software source code of the given software. To that end, each one of the first function identifier and the third function identifier may be represented as Pij, where i indicates a sequential number of a given one of the first function 251 and the second function 253, in which a given "action-argument" pair has been identified, and j indicates a sequential number of the given "action-argument" pair within the given function, in which the given pair has been detected.

As it may become apparent, software source codes of the majority of modern software programs can include a considerable number of functions. Therefore, in certain non-limiting embodiments of the present technology, the software source code of the given software can be transformed into an aggregated array of function identifiers including n lines, wherein n is indicative of a total number of non-library functions having been identified during the above analysis:

$$F1 = P11, P12, P13, ...P1j..., P1a \quad (1)$$

$$...$$

$$Fi = Pi1, Pi2, Pi3, ...Pij..., Pib$$

$$...$$

$$Fn = Pn1, Pn2, Pn3, ...Pnj..., Pnc$$

As it can be appreciated from the above, indices a, b, and c in Equation (1) are indicative of different numbers pairs "action-argument" within respective functions, in a general case.

The first method 100 thus advances to step 170.

Step 170: Applying, by the Processor, at Least One Classifier to the Aggregated Array of Function Identifiers Associated with the Given Software to Determine a Likelihood Parameter Indicative of the Given Software being Affiliated to a Respective Target Software At step 170, according to certain non-limiting embodiments of the present technology, the processor 501 can be configured to analyze the aggregated array of function identifiers expressed by Equation (1) to determine the affiliation of the given software with the target software. To that end, the processor 501 can be configured to feed the aggregated array of function identifiers into one or more classifiers having been trained to determine the affiliation with the target software. How the one or more classifiers can be trained, in accordance with certain non-limiting embodiments of the present technology, will be described below with reference to FIG. 4.

Further, in accordance with certain non-limiting embodiments of the present technology, the one or more classifiers, when applied to the aggregated array of function identifiers, may be configured to generate a likelihood parameter, which may be expressed, for example, as a numerical estimate of probability, that the given software is affiliated with the target software. The likelihood parameter can be constantly updated, i.e. reviewed at input of each portion of the software source code represented by Equation (1).

The first method 100 hence proceeds to step 180.

Step 180: In Response to the Likelihood Parameter being Equal to or Greater than a Predetermined Likelihood Parameter Threshold: Identifying the Given Software as being Affiliated to the Respective Target Software; Storing Data Indicative of the Given Software in A Database of Affiliated Software; and Using the Data Indicative of the Given Software for Further Determining Affiliation to the Given Target Software At step 180, in response to the likelihood parameter generated by the one or more classifiers being equal to or greater than a predetermined likelihood parameter threshold value, the processor 501 can be configured to identify the given software as being affiliated to the target software. As noted hereinabove, in some non-limiting embodiments of the present technology, the target software may include software of a predetermined software family and/or of a predetermined authorship.

Further, in certain non-limiting embodiments of the present technology, the processor 501 may be configured to store data indicative of the given software in a dedicated database for further use. For example, the processor 501 can be configured to use the data indicative of the given software to train the one or more classifiers to determine affiliation of other software to the given software.

In other non-limiting embodiments of the present technology, where the likelihood parameter is below the predetermined likelihood parameter threshold value, the processor 501 can be configured to determine that the given software is not affiliated to the target software; and thus, the processor 501 would not proceed to store the data indicative of the given software for further use.

The first method 100 thus terminates.

According to certain non-limiting embodiments of the present technology, the software source code of the given software can be obfuscated complicating the analysis thereof according to the first method 100. However, according to certain non-limiting embodiments of the present technology, the processor 501 may be configured to determine a specific obfuscation technique having been used for obfuscating the given software. To that end, for example, the processor 501 may be configured to apply (or otherwise have access to) a respective deobfuscator, i.e. a preliminarily prepared program intended to restore initial view of the software source code obfuscated by the specific obfuscation technique.

Figure 1B:
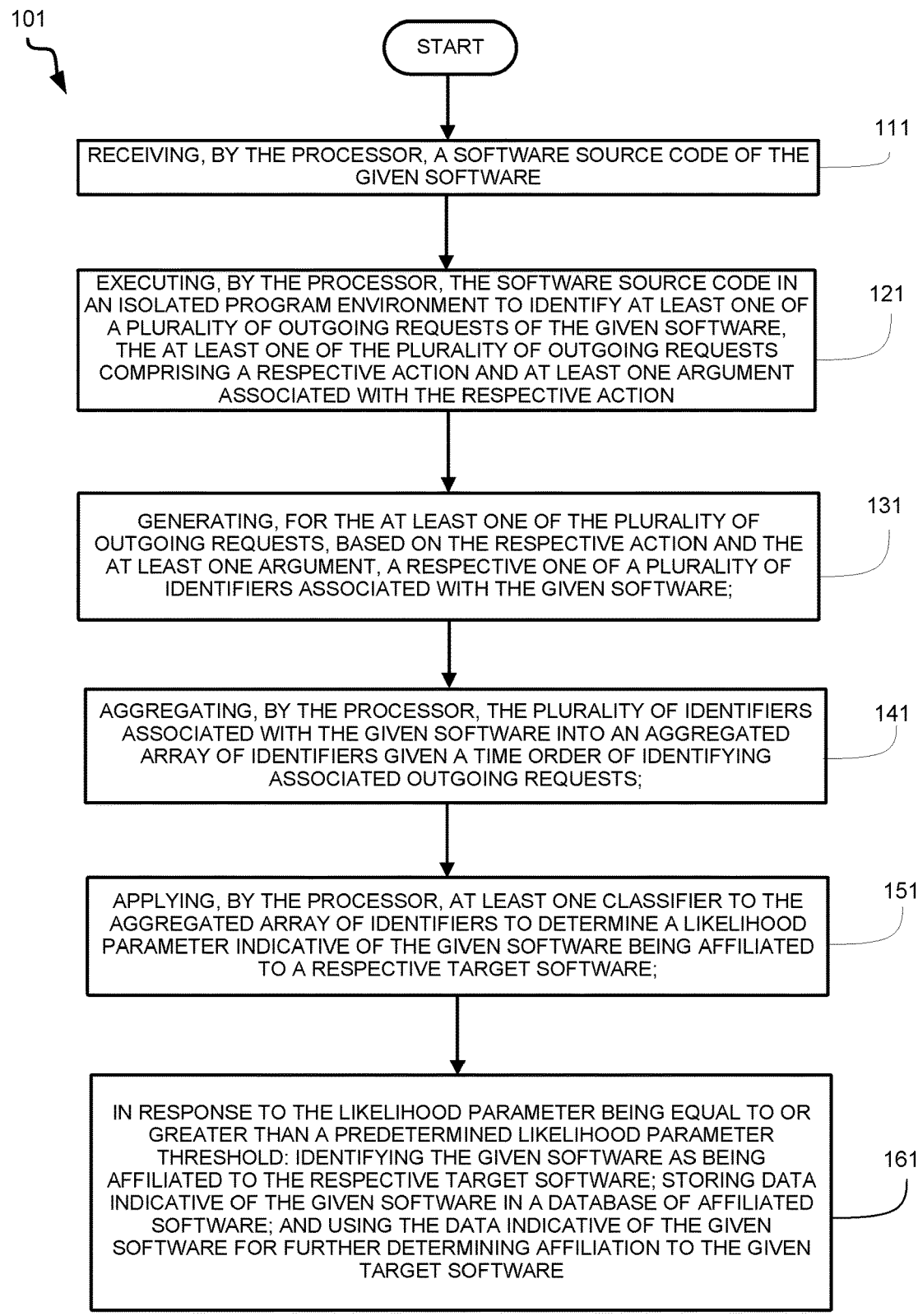

However, in accordance with other non-limiting embodiments of the present technology, the processor 501 may not be configured to determine the specific obfuscation technique having been used (for example, due to unavailability of the respective deobfuscator). Accordingly, the processor 501 may be configured to execute a second method 101 for determining the affiliation of the given software to the target software, whose flowchart diagram is depicted in FIG. 1B and to which the reference is currently being made.

Step 111: Receiving, by the Processor, a Software Source Code of the Given Software The second method 101 commences at step 111 where the processor 501 can be configured to receive the software source code associated with the given software. According to certain non-limiting embodiments of the present technology, step 111 is substantially analogous to step 110 of the first method 100 described above.

The second method 101 further proceeds to step 121.

Step 121: Executing, by the Processor, the Software Source Code in an Isolated Program Environment to Identify at Least One of a Plurality of Outgoing Requests of the Given Software Further, according to certain non-limiting embodiments of the present technology, at step 121, similar to step 120 of the first method 100 described above, the processor 501 can be configured to determine the reference data, including the program platform and the programming language associated with the software source code of the given software. Further, in certain non-limiting embodiments of the present technology, the processor 501 can be configured to execute the software source code in an isolated program environment including functionality for logging. As it can be appreciated, in these embodiments, the software source code may have been developed in one of interpreted programming languages. In various non-limiting embodiments of the present technology, the interpreted programming languages may include Python, Perl, PHP, Ruby, JavaScript, and the like.

For example, if the software source code has been developed in PowerShell, the processor 501 can be configured to use built-in logging facilities of Windows 10 operating system; alternatively, the processor 501 may be configured to use specialized Log4j logging library.

Accordingly, by executing the software source code in the isolated program environment, the processor 501 may be configured to identify at least one of a plurality of outgoing requests generated by the software source code. For example, the processor 501 may be configured to receive (and thus further identify) the plurality of outgoing requests including a COM object and an ActiveX control element call to a given framework. Further, in some non-limiting embodiments of the present technology, the plurality of outgoing requests may include program interrupt signals and system function calls to a given platform. The so received and identified plurality of outgoing requests can further be saved by the processor 501, for example, as a text file.

With reference to FIG. 2F, there is depicted a fragment of the plurality of outgoing requests 290 to the given framework and the given platform, in accordance with certain non-limiting embodiments of the present technology. In the depicted embodiments, the plurality of outgoing requests includes two outgoing requests: a first outgoing request 291 and a second outgoing request 296.

Further, in accordance with certain non-limiting embodiments of the present technology, the processor 501 can be configured to identify, within each one of the first outgoing request 291 and the second outgoing request 296, a respective pair "action-argument". For example, with continued reference to FIG. 2F, each one of the first outgoing request 291 and the second outgoing request 296 respectively include the following elements: (1) a first record sequence number 292 and a second record sequence number 297; (2) a first request function 293 and a second request function 298 having been called upon the execution of the software source code; (3) request statuses 294; and (4) a first request argument 295 and a second request argument 299 respectively associated with the first request function 293 and the second request function 298. Therefore, in this example, the processor 501 can be configured to parse the plurality of outgoing requests 290, thereby identifying individual outgoing requests, that is, the first outgoing request 291 and the second outgoing request 296, as portions of records logged by the isolated program environment and enclosed within record sequence numbers—that is, the first record sequence number 292 and the second record sequence number 297, respectively.

Thus, for each of the first outgoing request 291 and the second outgoing request 296, the processor 501 can be configured to identify a first pair "action-argument" including the first request function 293 and the first request argument 295; and a second pair "action-argument" including the second request function 298 and the second request argument 299. Further, the processor 501 can be configured to save the pairs "action-argument" in a dedicated file. Similar to the above description in respect of the first method 100, if the processor 501 has identified a given action whose argument is absent or has an improper format, the processor 501 can be configured to generate a respective pair "action-argument" where the argument has a zero value.

The method thus proceeds to step 131.

Step 131: Generating, for the at Least One of the Plurality of Outgoing Requests, Based on the Respective Action and the at Least One Argument, a Respective One of a Plurality of Identifiers Associated with the Given Software According to Certain Non-Limiting Embodiments of the Present Technology, at Step 131, the processor 501 can be configured to generate, for each one of the plurality of outgoing requests 290, a respective request identifier associated with the respective pair "action-argument". For example, the processor 501 can be configured to convert the respective pair "action-argument" into a respective number sequence as described above with respect to step 150 of the first method 100, that is, using the one or more hash functions.

Thus, in some non-limiting embodiments of the present technology, the processor 501 can be configured to generate, for the first pair "action-argument", based on the first request function 293 and the first request argument 295, a first request hexadecimal number, thereby generating a first request identifier:

00b66f89be96d7fa40e584d7eb9728f9b43e29d241d05-44c3f658c6b193d81f7e5e7201d0c02ef3a, where 00b66f89be96d7fa40e584d7eb9728f9b43e29d2 is a result of taking the one or more hash functions from the first request function 293 (that is, a first action), and 41d0544c3f658c6b193d81f7e5e7201d0c02ef3a is a result of taking the one or more hash functions from the first request argument 295. Similarly, the processor 501 can be configured to convert the second pair "action-argument" comprising the first request function 295 (that is, a second action) and the second request argument 299 into a second request hexadecimal number, thereby generating a second request identifier:

18ede0448e4ad01e04175beb0c5216977ddf8b74a94d5-f2d650020e4467fa02e979c295ab252f415.

Similar to the above-described method 100 with respect to the step 150, the processor 501 can be configured to apply more complicated conversion techniques to each one of the pairs "action-argument" into respective number sequences including serialization, as an example.

The second method 101 hence advances to step 141.

Step 141: Aggregating, by the Processor, the Plurality of Identifiers Associated with the Given Software into an Aggregated Array of Identifiers Given a Time Order of Identifying Associated Outgoing Requests At step 141, akin to step 160 of the first method 100 described above, the processor 501 can be configured to aggregate request identifiers associated with respective pairs "action-arguments" in an order of appearance of each one of the plurality of outgoing requests 290 associated therewith, thereby generating an aggregated array of request identifiers.

The second method 101 thus proceeds to step 151.

Step 151: Applying, by the Processor, at Least One Classifier to the Aggregated Array of Identifiers to Determine a Likelihood Parameter Indicative of the Given Software being Affiliated to A Respective Target Software At step 151, according to certain non-limiting embodiments of the present technology, the processor 501 can be configured to feed the aggregated array of request identifiers into one or more classifiers having been trained to determine the affiliation to the target software based on request identifiers generated as described above.

Accordingly, in certain non-limiting embodiments of the present technology, the one or more classifiers can be configured to generate a request likelihood parameter associated with the aggregated array of request identifiers. Further, the processor 501 can be configured to determine, based on the request likelihood parameter, the affiliation of the given software to the target software.

The second method 101 thus proceeds to step 161.

Step 161: In Response to the Likelihood Parameter being Equal to or Greater than a Predetermined Likelihood Parameter Threshold: Identifying the Given Software as being Affiliated to the Respective Target Software; Storing Data Indicative of the Given Software in A Database of Affiliated Software; and Using the Data Indicative of the Given Software for Further Determining Affiliation to the Given Target Software At step 161, in response to the request likelihood parameter generated by the one or more classifiers being equal to or greater than a predetermined request likelihood parameter threshold value, the processor 501 can be configured to identify the given software as being affiliated to the target software. As noted hereinabove, in some non-limiting embodiments of the present technology, the target software may include software of a predetermined software family and/or of a predetermined authorship.

Further, in certain non-limiting embodiments of the present technology, the processor 501 may be configured to store data indicative of the given software in the dedicated database for further use. For example, the processor 501 can be configured to use the data indicative of the given software to train the one or more classifiers to determine affiliation of other software to the given software.

In other non-limiting embodiments of the present technology, where the request likelihood parameter is below the predetermined request likelihood parameter threshold value, the processor 501 can be configured to determine that the given software is not affiliated to the target software; and thus, the processor 501 would not proceed to store the data indicative of the given software for further use.

The second method 101 thus terminates.

In some non-limiting embodiments of the present technology, after executing steps 130 and 131 of the first method 100 and the second method 101, respectively, each of the methods may further comprise an additional step of identifying, within the software source code, and deleting therefrom source code portions inherently non-indicative of the affiliation to the target software. In the context of the present specification, source code portions can be inherently non-indicative of the affiliation to the target software, by virtue of the portions of the software source code of the given software not being specific enough for further analysis of the given software for the affiliation thereof to the target software (for example, due to the fact that they often occur in different software and, thus, are not indicative enough of affiliation of any given software); and thus these source code portions can be omitted from the software source code without affecting the accuracy of such analysis. For example, inherently non-indicative source code portions may include function prologues of functions within the software source code.

Figure 3:
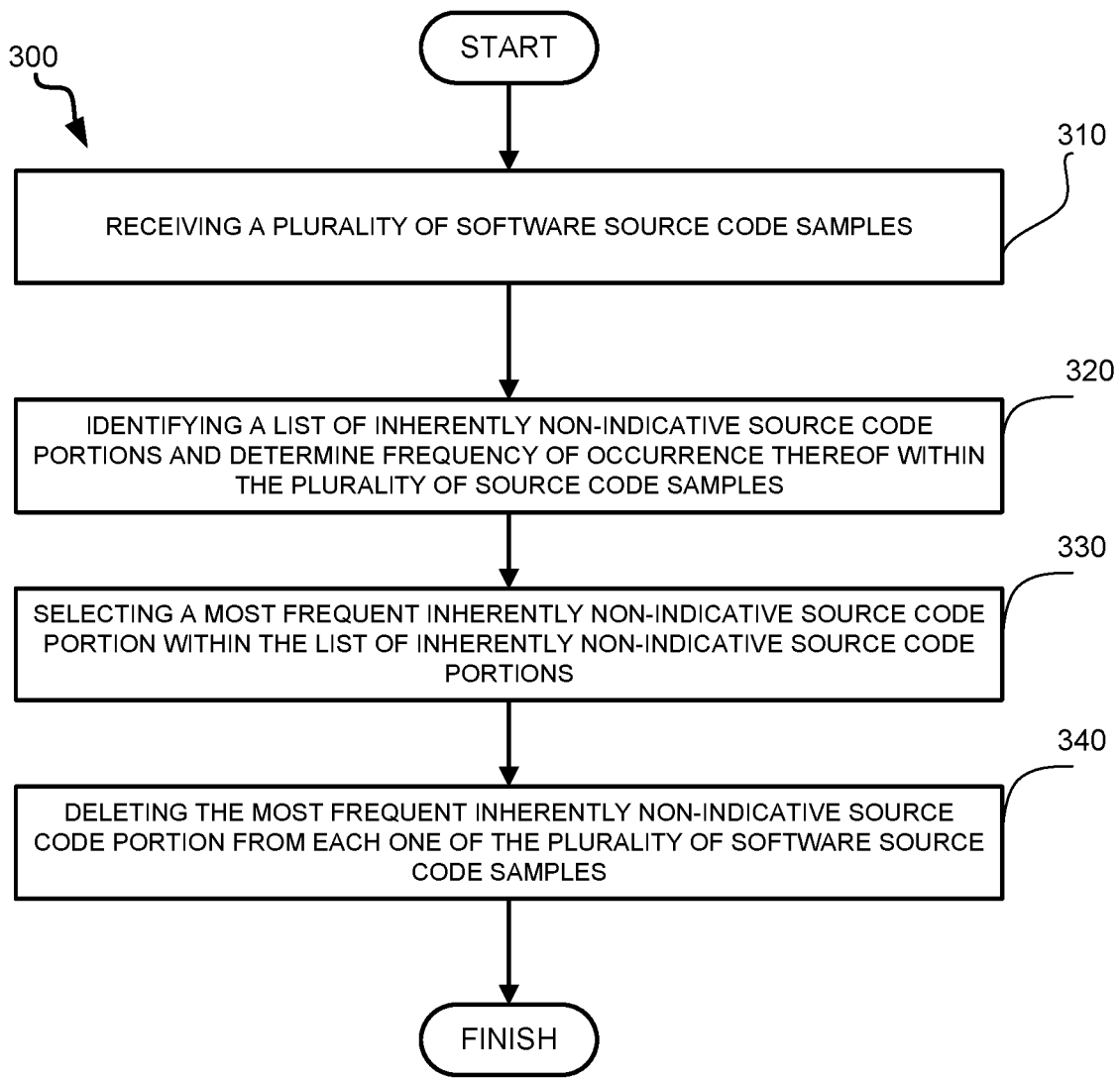
FIG. 3 depicts a flowchart diagram of a method for identifying and deleting regular source code portions in the software source code, in accordance with certain non-limiting embodiments of the present technology.

To that end, the processor 501 can be configured to execute a third method 300, a flowchart diagram of which is depicted in FIG. 3, and to which reference is currently being made.

Step 310: Receiving a Plurality of Software Source Code Samples

The third method 300 commences at step 310 with the processor 501 being configured to receive a plurality of software source code samples associated with the given software. In certain non-limiting embodiments of the present technology, the plurality of software source code samples may include, for example hundreds, thousands, or even hundreds of thousands of software source code samples associated with the given software, however, different in functionality and having been developed by different teams of developers.

The third method 300 further proceeds to step 320.

Step 320: Identifying a List of Inherently Non-Indicative Source Code Portions and Determine Frequency of Occurrence Thereof within the Plurality of Source Code Samples At step 320, according to certain non-limiting embodiments of the present technology, the processor 501 can be configured to identify, within the software source code, inherently non-indicative source code portions repeatedly occurred therewithin. In some non-limiting embodiments of the present technology, the processor 501 can further be configured to determine a frequency of occurrence of each inherently non-indicative source code portion within the plurality of source code samples. For example, in some non-limiting embodiments of the present technology, the processor 501 can be preliminarily provided with a minimum sequence length value, e.g., 20 symbols, for identifying the inherently non-indicative source code portions within the plurality of software source code samples. In some non-limiting embodiments of the present technology, a maximum sequence length value may not be preset. Thus, the processor 501 can be configured to generate a list of inherently non-indicative source code portions with associated respective frequencies of occurrences thereof.

The third method 300 thus proceeds to step 330.

Step 330: Selecting a Most Frequent Inherently Non-Indicative Source Code Portion within the List of Inherently Non-Indicative Source Code Portions Further, at step 330, the processor 501 can be configured to select, from the list of inherently non-indicative source code portions generated at the previous steps, based on the associated respective frequencies of occurrences, a most frequent inherently non-indicative source code portion. For example, a given inherently non-indicative source code portion has been occurred once in each one of the plurality of software source code samples including, for example, 100 software source code samples, which amounts to 100 Occurrences of the given inherently non-indicative source code portions therewithin.

Also, in some non-limiting embodiments of the present technology, the processor 501 can be configured to select a sub-plurality of most frequent inherently non-indicative source code portions based on a predetermined frequency threshold value, which can be determined, for example, based on a number of software source code samples within the plurality of software source code samples including the given inherently non-indicative source code portion.

The third method 300 thus advances to step 340.

Step 340: Deleting the Most Frequent Inherently Non-Indicative Source Code Portion from Each One of the Plurality of Software Source Code Samples At step 340, according to certain non-limiting embodiments of the present technology, the processor 501 may be configured to delete the most frequent inherently non-indicative source code portion identified at step 330 from each one of the plurality of software source code samples associated with the given software.

Thus, by executing the third method 300, the processor 501 can be configured to delete the inherently non-indicative source code portions from the software source code associated with the given software. Accordingly, in some non-limiting embodiments of the present technology, upon completion of the third method 300, the processor 501 can be configured to proceed to steps 140 and 141 of the first method 100 and the second method 101, respectively.

The third method 300 thus terminates.

Training Classifier

Figure 4:
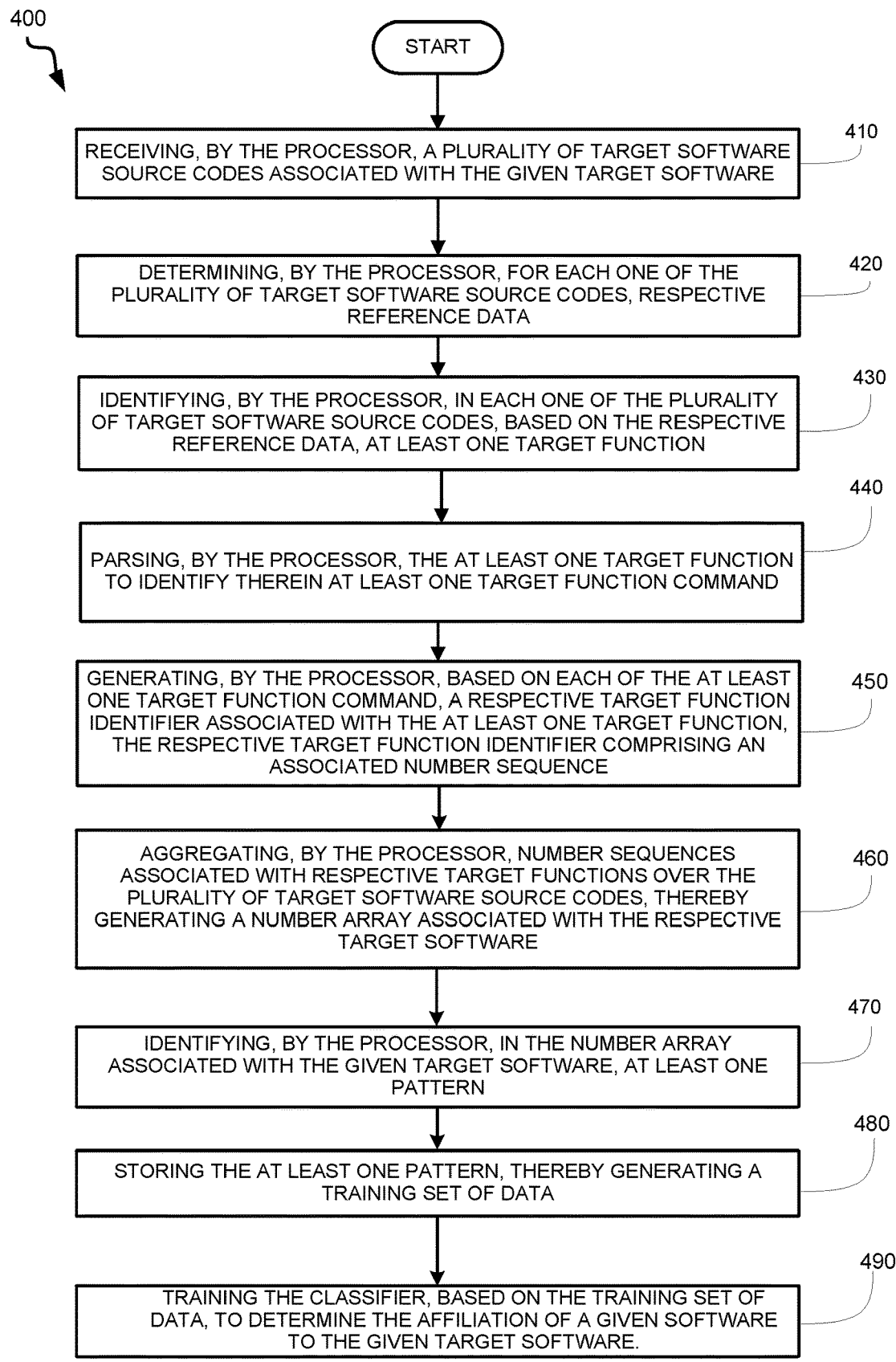
FIG. 4 depicts a flowchart diagram of a method for training a classifier used in one of the methods of FIGS. 1A and 1B for determining the affiliation of the given software with the target software, in accordance with certain non-limiting embodiments of the present technology.

As alluded to hereinabove, according to certain non-limiting embodiments of the present technology, the processor 501 can be configured to train the one or more classifier to determine the affiliation with respective target software, which may further be used in the first method 100 and method 101. With reference now to FIG. 4, there is depicted a flowchart diagram of a fourth method 400 for training a classifier to determine the affiliation with a given target software, in accordance with certain non-limiting embodiments of the present technology.

Step 410: Receiving, by the Processor, a Plurality of Target Software Source Codes Associated with the Given Target Software The fourth method 400 commences at step 410 with the processor 501 being configured to receive a plurality of target software source codes associated with the given target software. According to certain non-limiting embodiments of the present technology, a total number of software source codes in the plurality thereof can be predetermined and comprise, for example, without limitation around 30-70 software source codes of a predetermined software family to which the given target software belongs. Alternatively, the processor 501 can be configured to receive around 20-30 software source codes of a predetermined authorship associated with the given target software. Further, the processor 501 can be configured to analyze each one of the plurality of target software source codes, for example, sequentially.

The fourth method 400 hence advances to step 420.

Step 420: Determining, by the Processor, for Each One of the Plurality of Target Software Source Codes, Respective Reference Data At step 420, according to certain non-limiting embodiments of the present technology, the processor 501 can be configured to determine a program platform and a programming language of each one of the plurality of target software source codes associated with the given target software. In these embodiments, the processor 501 can be configured to execute step 420 similar to executing step 120 of the first method 100 described above.

The fourth method 400 thus proceeds to step 430.

Step 430: Identifying, by the Processor, in Each One of the Plurality of Target Software Source Codes, Based on the Respective Reference Data, at Least One Target Function At step 430, the processor 501 can be configured to parse each one of the plurality of target software source codes to identify therein at least one target function. In certain non-limiting embodiments of the present technology, the processor 501 can be configured to parse a given one of the plurality of target software source codes using the function parser configured for parsing a given target software source code based on reference data associated therewith—that is, a programming language and a program platform associated therewith. Thus, in these embodiments, the processor 501 can be configured to execute step 430 similar to executing step 130 of the method 110. The fourth method 400 thus proceeds to step 440.

Step 440: Parsing, by the Processor, the at Least One Target Function to Identify Therein at Least One Target Function Command Akin to executing step 140 of the first method 100 described above, at step 440, the processor 501 can be configured to parse the at least one target function to identify therein at least one target function command. Accordingly, as described above, the at least one function command may further comprise at least one target pair "action-argument" including a given target action and a target argument associated therewith.

Further, in some non-limiting embodiments of the present technology, the processor 501 can be configured to identify, in the given one of the plurality of target software source codes, library functions and delete them therefrom, as described above with respect to step 130 of the first method 100.

In other non-limiting embodiments of the present technology, the processor 501 can further be configured to identify, in the given one of the plurality of target software source codes, inherently non-indicative source code portions and delete them therefrom, as described above with reference to FIG. 3 in respect of the third method 300.

The fourth method 400 thus proceeds to step 450.

Step 450: Generating, by the Processor, Based on Each of the at Least One Target Function Command, a Respective Target Function Identifier Associated with the at Least One Target Function, the Respective Target Function Identifier Comprising an Associated Number Sequence At step 450, according to certain non-limiting embodiments of the present technology, the processor 501 can be configured to generate for the at least one target pair "action-argument" a respective target function identifier. In some non-limiting embodiments of the present technology, the processor 501 can be configured to generate the respective target function identifier as a respective number sequence, similar to generating the respective function identifier as described above in respect of step 150 of the first method 100.

Further, the processor 501 can be configured to save the respective target function identifier associated with the at least one target pair "action-argument" for further use.

The fourth method 400 further advances to step 460.

Step 460: Aggregating, by the Processor, Number Sequences Associated with Respective Target Functions Over the Plurality of Target Software Source Codes, Thereby Generating a Number Array Associated with the Respective Target Software At step 460, according to certain non-limiting embodiments of the present technology, the processor 501 can be configured to aggregate target function identifiers over the plurality of target software source codes to generate a target number array associated with the given target software. For example, the processor 501 can be configured to aggregate the target function identifiers in an order of occurrence of functions associated therewith as described above with respect to step 160 of the first method 100.

The method thus proceeds to step 470.

Step 470: Identifying, by the Processor, in the Number Array Associated with the Given Target Software, at Least One Pattern At step 470, according to certain non-limiting embodiments of the present technology, the processor 501 can be configured to identify, in the target number array, at least one pattern associated with the given target software. In some non-limiting embodiments of the present technology, the at least one pattern comprises a predetermined repetitive number sequence within the target number array. Thus, in these embodiments, the predetermined repetitive number sequence can be said to be indicative of a frequency of occurrence of the at least one target pair "action-argument" within the given target software.

According to certain non-limiting embodiments of the present technology, a length of the predetermined repetitive number sequence, i.e. a number of symbols therein, can be predetermined. Thus, in some non-limiting embodiments of the present technology, the length of the predetermined repetitive number sequence could be based on an interval, for example, from 4 to 10 symbols within the target number array or, alternatively, for example, from 60 to 80 symbols within the target number array. In other non-limiting embodiments of the present technology, the length of the predetermined repetitive number sequence could be predetermined as a constant number, e.g. 40 symbols within the target number array associated with the given target software.

In yet other non-limiting embodiments of the present technology, the length of the predetermined repetitive number sequence could be determined iteratively, based on a current number of such a predetermined repetitive number sequence within the aggregated array of target identifiers. In these embodiments, a search begins, for example, at an initial length of 8 symbols. Once a number of identified number sequences of the initial length exceeds a predetermined pattern threshold value (100, as an example), the initial length increases by one, and the search starts over omitting shorter number sequences detected before. Such cycle is repeated until the number of patterns of a maximum possible length less than the predetermined pattern threshold value is identified. Thus, the at least one pattern may further be part of a training set of data for training the classifier.

In some non-limiting embodiments of the present technology, the processor 501 can be configured to assign to the at least one pattern a respective weight value.

In some non-limiting embodiments of the present technology, the respective weight value can be determined based on types of commands and operations associated with the at least one pattern. For example, the respective weight value can be 2 times exceeding respective weight values of other patterns the at least one pattern is indicative of commands at least one math operation. In another example, the respective weight value can be, e.g. 3 times exceeding weight values of other patterns, if the at least one pattern is indicative of at least 2 string constants.

By contrast, the respective weight value can be decreased, e.g. can comprise 0.3 of weight values of other patterns, if the at least one pattern includes symbols indicative of neither commands with math operations nor string constants.

Further, in some non-limiting embodiments of the present technology, the processor 501 can be configured to determine a frequency of occurrence of the at least one pattern within the target number array. Broadly speaking, the frequency of occurrence of the at least one pattern can be a numeric value indicating how often the at least one pattern occurs in the plurality of target software source codes associated with the given target software, i.e. how often an associated set of commands occurs within the given target software.

In some non-limiting embodiments of the present technology, the frequency of occurrence of the at least one pattern can be determined according to the following equation:

$$\lambda = L/K, \quad (2)$$

where L is a frequency of occurrence of the at least one pattern within the target number array of target identifiers associated with the given target software, and K is a number of software source codes in the plurality of target software source codes associated with the given target software.

In some non-limiting embodiments of the present technology, the respective weight value to be assigned to the at least one pattern may be based on the frequency of occurrence thereof determined in accordance with Equation (2).

The fourth method 400 thus proceeds to step 480.

Step 480: Storing the at Least One Pattern, Thereby Generating A Training Set of Data Further, at step 480, in some non-limiting embodiments of the present technology, the processor 501 can be configured to assign the at least one pattern with a label indicative of an association between the at least one pattern and the given target software. Thus, the processor 501 can be configured to store the at least one pattern associated with the label and the respective weight value in the training set of data used for training the classifier.

The fourth method 400 finally advances to step 490.

Step 490: Training the Classifier, Based on the Training Set of Data, to Determine the Affiliation of a Given Software to the Given Target Software At step 490, the processor 501 can be configured to train the classifier, based on the so generated training set of data, to determine the affiliation to the given target software. It should be expressly understood that it is not limited as to how the classifier can be implemented, and in various non-limiting embodiments of the present technology, the classifier can be implemented, for example, as one of a probabilistic graph model (Random Forest) and as a SVM-classifier.

In specific non-limiting embodiments of the present technology, the processor 501 can be configured to train the classifier using one or more machine-learning techniques.

The fourth method 400 thus terminates.

As noted hereinabove, according to certain non-limiting embodiments of the present technology, the classifier trained in accordance with the fourth method 400 may thus be used at step 170 of the first method 100 for determining the affiliation of the given software to the target software.

It should be expressly understood that a similar method for training the classifier to be used in the second method 101, that is, based on outgoing requests generated by the given target software executed in the isolated program environment, and whose target software source codes are obfuscated, may be devised, mutatis mutandis, without departing from the scope of the present technology. Thus, the classifier trained in accordance with a such a method can be used at step 151 for determining the affiliation of the given software to the target software.

Computing Environment

Figure 5:
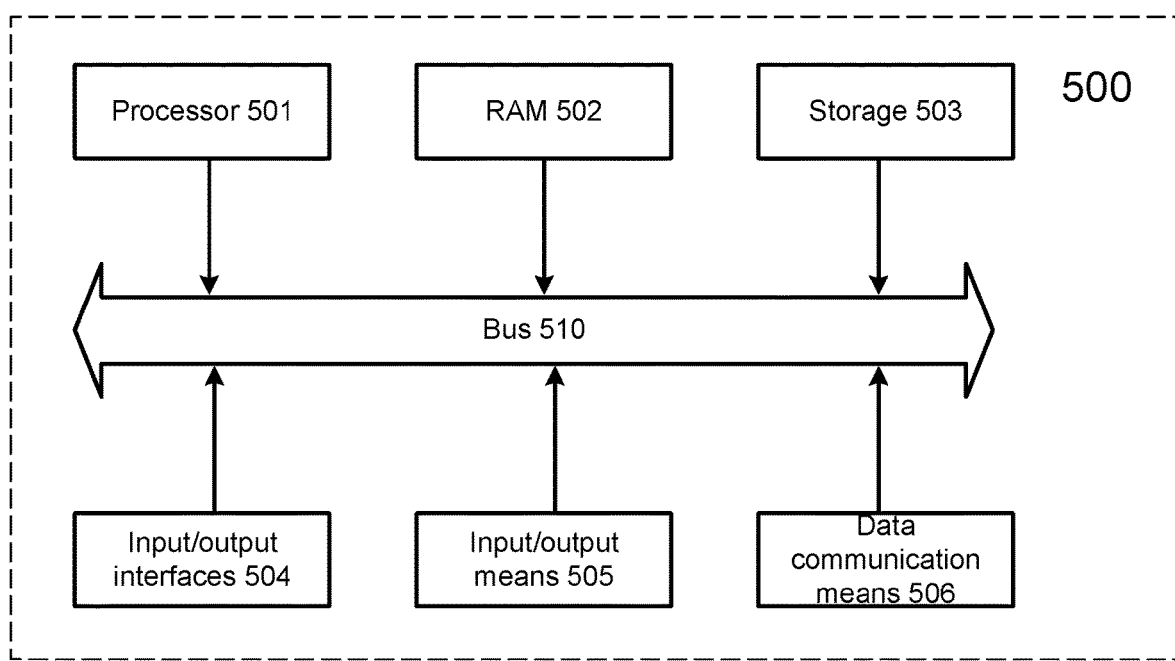
FIG. 5 depicts a schematic diagram of an example computing environment configurable for execution of one of the methods of FIGS. 1A, 1B, 3, and 4, in accordance with certain non-limiting embodiments of the present technology.

With reference to FIG. 5, there is depicted an example functional diagram of the computing device 500 configurable to implement certain non-limiting embodiments of the present technology including the first method 100, the second method 101, the third method 300, and the fourth method 400 described above.

In some non-limiting embodiments of the present technology, the computing device 500 may include: the processor 501 comprising one or more central processing units (CPUs), at least one non-transitory computer-readable memory 502 (RAM), a storage 503, input/output interfaces 504, input/output means 505, data communication means 506.

According to some non-limiting embodiments of the present technology, the processor 501 may be configured to execute specific program instructions the computations as required for the computing device 500 to function properly or to ensure the functioning of one or more of its components. The processor 501 may further be configured to execute specific machine-readable instructions stored in the at least one non-transitory computer-readable memory 502, for example, those causing the computing device 500 to execute one of the first method 100, the second method 101, the third method 300, and the fourth method 400.

In some non-limiting embodiments of the present technology, the machine-readable instructions representative of software components of disclosed systems may be implemented using any programming language or scripts, such as C, C++, C#, Java, JavaScript, VBScript, Macromedia Cold Fusion, COBOL, Microsoft Active Server Pages, Assembly, Perl, PHP, AWK, Python, Visual Basic, SQL Stored Procedures, PL/SQL, any UNIX shell scrips or XML. Various algorithms are implemented with any combination of the data structures, objects, processes, procedures and other software elements.

The at least one non-transitory computer-readable memory 502 may be implemented as RAM and contains the necessary program logic to provide the requisite functionality.

The storage 503 may be implemented as at least one of an HDD drive, an SSD drive, a RAID array, a network storage, a flash memory, an optical drive (such as CD, DVD, MD, Blu-ray), etc. The storage 503 may be configured for long-term storage of various data, e.g., the aforementioned documents with user data sets, databases with the time intervals measured for each user, user IDs, etc.

The input/output interfaces 504 may comprise various interfaces, such as at least one of USB, RS232, RJ45, LPT, COM, HDMI, PS/2, Lightning, FireWire, etc.

The input/output means 505 may include at least one of a keyboard, joystick, (touchscreen) display, projector, touchpad, mouse, trackball, stylus, speakers, microphone, and the like. A communication link between each one of the input/output means 505 can be wired (for example, connecting the keyboard via a PS/2 or USB port on the chassis of the desktop PC) or wireless (for example, via a wireless link, e.g., radio link, to the base station which is directly connected to the PC, e.g., to a USB port).

The data communication means 506 may be selected based on a particular implementation of the network 120, and may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the connectivity hardware 404 may be configured for wired and wireless data transmission, via one of WAN, PAN, LAN, Intranet, Internet, WLAN, WMAN, or GSM networks.

These and other components of the computing device 500 may be linked together using a common data bus 510.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for determining an affiliation of a given software with target software, the method being executable by a processor, the method comprising:
   receiving, by the processor, a software source code of the given software;
   determining, by the processor, reference data associated with software source code;
   parsing, by the processor, based on the reference data associated with software source code, the software source code to identify therein at least one function,
      the identifying comprising identifying, in the software source code, library functions and deleting the library function by applying, by the processor, a signature analysis to the software source code;
   parsing, by the processor, the at least one function to identify therein at least one function command,
      the at least one function command comprising a respective action and at least one argument associated with the at least one action;
   generating, by the processor, for the at least one function, based on the respective action and the at least one argument thereof, a respective one of a plurality of function identifiers associated with the given software,
      the generating comprising applying, by the processor, a hash function to the respective action and to each value of the at least one argument associated therewith to generate respective hash function values; and aggregating the respective hash function values;
   aggregating, by the processor, the plurality of function identifiers associated with the given software into an aggregated array of function identifiers given an order of occurrence of associated functions within the software source code;
   applying, by the processor, at least one classifier to the aggregated array of function identifiers associated with the given software to determine a likelihood parameter indicative of the given software being affiliated to a respective target software,
      the at least one classifier having been trained to determine the affiliation with the respective target software;
   in response to the likelihood parameter being equal to or greater than a predetermined likelihood parameter threshold:
      identifying the given software as being affiliated to the respective target software;
      storing data indicative of the given software in a database of affiliated software; and
      using the data indicative of the given software for further determining affiliation to the given target software.

2. The method of claim 1, wherein the identifying the library functions further comprises identifying, in the software source code, source code portions inherently non-indicative of the affiliation to the target software, and deleting the source code portions inherently non-indicative of the affiliation to the target software from the software source code.

3. The method of claim 1, wherein the applying the hash function further comprises applying a first hash function to the respective action and applying a second hash function to the at least one argument, the second hash function being different from the first hash function.

4. The method of claim 1, wherein, the generating the respective one of the plurality of identifiers further comprises applying a serialization process to the at least one action and the at least one argument associated therewith.

5. A method for training a classifier to determine an affiliation with a given target software, the method being executable by a processor, the method comprising:
   receiving, by the processor, a plurality of target software source codes associated with the given target software;
   determining, by the processor, for each one of the plurality of target software source codes, respective reference data;
   identifying, by the processor, in each one of the plurality of target software source codes, based on the respective reference data, at least one target function;
   parsing, by the processor, the at least one target function to identify therein at least one target function command;

generating, by the processor, based on each of the at least one target function command, a respective target function identifier associated with the at least one target function, the respective target function identifier comprising an associated number sequence;

aggregating, by the processor, number sequences associated with respective target functions over the plurality of target software source codes, thereby generating a number array associated with the respective target software;

identifying, by the processor, in the number array associated with the given target software, at least one pattern, wherein:
- the at least one pattern comprises a predetermined repetitive number sequence within the number array, and
- the predetermined repetitive number sequence is indicative of a frequency of occurrence of at least one associated target function command within the given target software;

storing the at least one pattern, thereby generating a training set of data,
- the training set of data comprising a plurality of patterns, a given pattern of the plurality of patterns including a respective label being indicative of an association between the given pattern and the given target software;

training the classifier, based on the training set of data, to determine the affiliation of a given software to the given target software.

6. The method of claim 5, wherein the identifying the at least one target function further comprises identifying, in each of the plurality of software source codes, library functions and deleting the library functions.

7. The method of claim 6, wherein the identifying the library functions further comprises identifying, in each of the plurality of software source codes, source code portions inherently non-indicative of the affiliation to the target software, and deleting the source code portions inherently non-indicative of the affiliation to the given target software from each of the plurality of software source codes.

8. The method of claim 5, wherein the at least one target function command comprises at least one action and at least one argument associated with the at least one action; and
the generating the respective target function identifier further comprises:
applying a hash function to the at least one action and to each value of the at least one argument to generate respective hash function values, each one of the respective hash function values being a respective number sequence; and
concatenating the respective hash function values.

9. The method of claim 5, wherein the target software is associated with at least one of: a predetermined software family, and a predetermined authorship.

10. The method of claim 5, further comprising determining a frequency occurrence value associated with the at least one pattern, the determining being according to the following formula:

$$\lambda = \frac{L}{K},$$

where L is a frequency of occurrence of the at least one pattern within the number array associated with the respective target software, and K is a number of software source codes in the plurality of software source codes associated with the respective target software used for generating the training set of data.

11. The method of claim 5, further comprising assigning a weight value to the at least one pattern.

12. The method of claim 11, wherein the weight value is further determined based on the frequency of occurrence value associated with the at least one pattern.

13. A method for determining an affiliation of a given software with target software, the method being executable by a processor, the method comprising:
receiving, by the processor, a software source code of the given software;
executing, by the processor, the software source code in an isolated program environment to identify at least one of a plurality of outgoing requests of the given software,
the at least one of the plurality of outgoing requests comprising a respective action and at least one argument associated with the respective action; and
generating, for the at least one of the plurality of outgoing requests, based on the respective action and the at least one argument, a respective one of a plurality of identifiers associated with the given software;
aggregating, by the processor, the plurality of identifiers associated with the given software into an aggregated array of identifiers given a time order of identifying associated outgoing requests;
applying, by the processor, at least one classifier to the aggregated array of identifiers to determine a likelihood parameter indicative of the given software being affiliated to a respective target software;
in response to the likelihood parameter being equal to or greater than a predetermined likelihood parameter threshold:
identifying the given software as being affiliated to the respective target software;
storing data indicative of the given software in a database of affiliated software; and
using the data indicative of the given software for further determining affiliation to the respective target software.

14. The method of claim 13, wherein the receiving the software source code further comprises identifying therein source code portions inherently non-indicative of the affiliation to the target software, and deleting the source code portions inherently non-indicative of the affiliation to the target software from the software source code.

15. The method of claim 13, wherein:
the generating the respective one of the plurality of identifiers further comprises:
applying a hash function to the respective action and to each value of the at least one argument associated with the at least one of the plurality of outgoing requests to generate respective hash function values, each one of the respective hash function values being a respective number sequence;
concatenating the respective hash function values.

16. The method of claim 15, wherein the applying the hash function further comprises applying a first hash function to the respective action and applying a second hash function to the at least one argument, the second hash function being different from the first hash function.

17. The method of claim 15, wherein, the generating the respective one of the plurality of identifiers further comprises applying a serialization process to the at least one action and the at least one argument associated therewith.

18. The method of claim 13, wherein the respective target software is associated with at least one of:
a predetermined software family, and a predetermined authorship.

19. The method of claim 13, wherein the at least one classifier has been trained to determine the affiliation to the respective target software based on a training set of data, and the method further comprising generating the training set of data, the generating comprising:
receiving, by the processor, a plurality of target software source codes associated with the respective target software;
executing, by the processor, a given one of the plurality of target software source codes in the isolated program environment to identify at least one of a respective plurality of target outgoing requests of the respective target software,
the at least one of the respective plurality of outgoing requests comprising a respective target action and at least one target argument associated with the respective target action;
generating, for the at least one of the respective plurality of target outgoing requests, based on the respective target action and the at least one target argument, a respective one of a respective plurality of target identifiers associated with the respective target software;
aggregating, by the processor, target identifiers associated with the respective target software over respective pluralities of target identifiers into an aggregated array of target identifiers given a time order of identifying associated target outgoing requests;
identifying, by the processor, in the aggregated array of target identifiers associated with the respective target software, at least one pattern, wherein:
the at least one pattern comprises a predetermined repetitive sequence of a given target identifier within the aggregated array of target identifiers, and
the predetermined repetitive sequence of the given target identifier is indicative of a frequency of the respective target software executing the respective target action in the isolated program environment;
storing the at least one pattern with a label indicative of an association between the at least one pattern and the respective target software for inclusion thereof into the training set of data.

20. The method of claim 19, wherein a length of the predetermined repetitive sequence is determined as a constant number.

21. The method of claim 20, wherein the length of the predetermined repetitive sequence is further determined iteratively, based on a current number thereof within the aggregated array of target identifiers.

22. The method of claim 19, further comprising determining a frequency occurrence value associated with the at least one pattern, the determining being according to the following formula:

$$\lambda = \frac{L}{K},$$

where L is a frequency of occurrence of the at least one pattern within the aggregated array of target identifiers associated with the respective target software, and K is a number of software source codes in the plurality of software source codes associated with the respective target software used for generating the training set of data.

23. The method of claim 19, further comprising assigning a weight value to the at least one pattern.

24. The method of claim 23, wherein the weight value is indicative of a type of the respective action associated with the at least one of the plurality of outgoing requests of the respective target software.

25. The method of claim 23, wherein the weight value is further determined based on the frequency of occurrence value associated with the at least one pattern.

* * * * *